(12) United States Patent
Ossyra

(10) Patent No.: US 9,534,584 B2
(45) Date of Patent: Jan. 3, 2017

(54) WIND TURBINE ELECTRIC GENERATOR WITH TORQUE LIMITING BRAKE

(71) Applicant: Cooper Industries Holdings, Dublin (IE)

(72) Inventor: Jean-Claude Ossyra, Bloomfield Hills, MI (US)

(73) Assignee: Cooper Industries Holdings, Dublin (IE)

( * ) Notice: Subject to any disclaimer, the term of this patent is extended or adjusted under 35 U.S.C. 154(b) by 0 days.

(21) Appl. No.: 14/222,420

(22) Filed: Mar. 21, 2014

(65) Prior Publication Data

US 2014/0367967 A1    Dec. 18, 2014

Related U.S. Application Data

(60) Provisional application No. 61/834,646, filed on Jun. 13, 2013.

(51) Int. Cl.
*F03D 9/00*    (2016.01)
*H02P 9/04*    (2006.01)
*F03D 7/02*    (2006.01)

(52) U.S. Cl.
CPC .......... *F03D 7/0248* (2013.01); *F03D 7/0224* (2013.01); *F03D 7/0296* (2013.01);
(Continued)

(58) Field of Classification Search
CPC .... F03D 7/0224; F03D 7/0248; F03D 7/0296; F05B 2260/821; F05B 2260/902; F05B 2270/322; F05B 2270/335; F05B 2270/808
(Continued)

(56) References Cited

U.S. PATENT DOCUMENTS 4,490,093 A * 12/1984 Chertok ................ F03D 7/0224
                                                                          416/152
7,559,870 B2    7/2009 Hicks
(Continued)

FOREIGN PATENT DOCUMENTS

CN        201250753 Y       6/2009
CN        201627766 U      11/2010
(Continued)

OTHER PUBLICATIONS

International Search Report PCT/US2014/041130.
(Continued)

*Primary Examiner* — Tulsidas C Patel
*Assistant Examiner* — Thomas Quigley
(74) *Attorney, Agent, or Firm* — Ralph E. Jocke; Walker & Jocke

(57) ABSTRACT

A wind turbine system includes turbine blades (16) that turn a low speed shaft (18). A shrink disc coupling (24) radially connects the low speed shaft to a low speed gear box input shaft (22). A brake (26) for the gear box input shaft is operatively connected with the coupling. At least one circuit including a processor controls the brake to keep torsional force on the gear box input shaft below a threshold. The at least one circuit is associated with sensors that can sense conditions away from the gear box input shaft. The at least one circuit can determine when a current condition exists which can cause the threshold to soon be exceeded if preventive braking is not timely applied to the gear box input shaft. The current condition can include a sensed weather condition that is approaching the wind turbine system.

21 Claims, 17 Drawing Sheets

(52) U.S. Cl.
CPC ... *F05B 2260/821* (2013.01); *F05B 2260/902* (2013.01); *F05B 2270/322* (2013.01); *F05B 2270/335* (2013.01); *F05B 2270/808* (2013.01); *Y02E 10/723* (2013.01)

(58) Field of Classification Search
USPC ........ 290/44, 55; 415/7; 416/227 R; 475/31, 475/149
See application file for complete search history.

(56) References Cited

U.S. PATENT DOCUMENTS

| | | | |
|---|---|---|---|
| 7,837,406 B2 * | 11/2010 | Landwehr | 403/31 |
| 7,843,080 B2 | 11/2010 | Jansen | |
| 7,939,955 B2 | 5/2011 | Steiner | |
| 7,963,743 B1 | 6/2011 | Winter | |
| 8,203,229 B2 | 6/2012 | Stone | |
| 8,269,367 B2 | 9/2012 | Wei et al. | |
| 8,308,430 B2 | 11/2012 | Bevington et al. | |
| 8,502,403 B2 | 8/2013 | Merswolke et al. | |
| 2009/0058086 A1* | 3/2009 | Arinaga | F03D 7/0224 290/44 |
| 2009/0294225 A1 | 12/2009 | Skjaerbaek | |
| 2010/0135789 A1 | 6/2010 | Zheng et al. | |
| 2011/0187107 A1 | 8/2011 | Toyohara et al. | |
| 2011/0221193 A1 | 9/2011 | Kalen et al. | |
| 2011/0238371 A1 | 9/2011 | Altemark et al. | |
| 2011/0268555 A1 | 11/2011 | Neumann | |
| 2011/0272214 A1 | 11/2011 | Vuolle-Apiala et al. | |
| 2011/0295438 A1* | 12/2011 | Rogers | F03D 7/0204 700/287 |
| 2012/0104754 A1* | 5/2012 | Rudolf | F03D 7/0284 290/44 |
| 2012/0187683 A1 | 7/2012 | Wohlleb | |
| 2012/0267210 A1 | 10/2012 | Minegishi | |
| 2013/0038065 A1 | 2/2013 | Versteeg | |

FOREIGN PATENT DOCUMENTS

| | | |
|---|---|---|
| CN | 102022261 A | 4/2011 |
| CN | 102102627 A | 6/2011 |
| DE | 31 17996 A1 | 7/1981 |
| DE | 10 2006 001613 A1 | 7/2007 |
| EP | 0 097 635 A2 | 4/1984 |
| EP | 2 383 467 A2 | 2/2011 |
| EP | 2 330 296 A2 | 6/2011 |
| EP | 2 341 244 A2 | 6/2011 |
| EP | 1 595 088 B1 | 1/2012 |
| EP | 2 315 939 B1 | 3/2012 |
| GB | 2 206 930 A | 1/1989 |
| JP | 580 57083 A | 4/1983 |
| JP | 2012-140885 | 7/2012 |

OTHER PUBLICATIONS

Written Opinion of the International Search Authority PCT/US2014/041130.

Communication of Results of the Partial International Search PCT/US2014/041130.

* cited by examiner

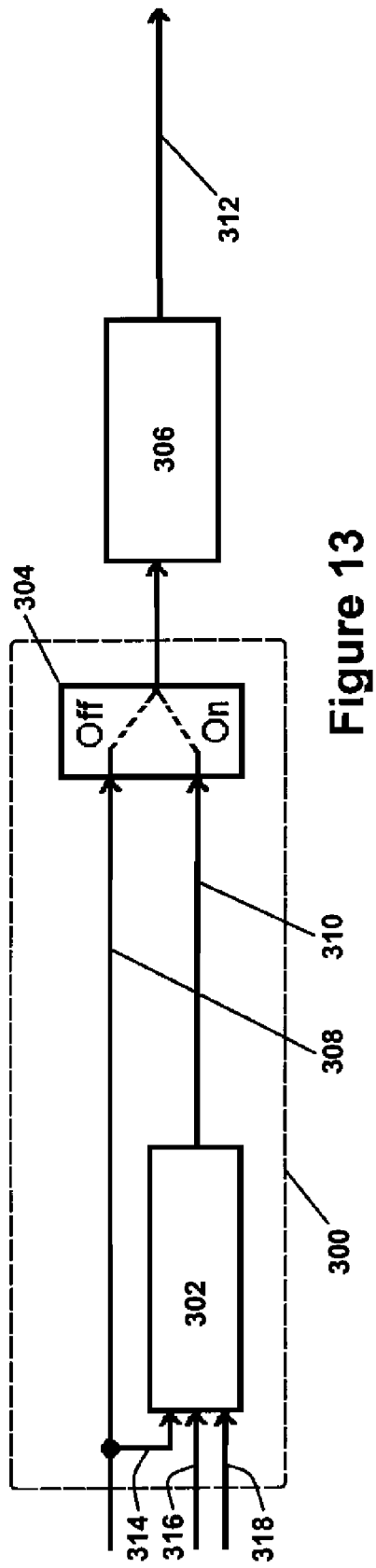
Figure 13
Figure 14
Figure 15

WIND TURBINE ELECTRIC GENERATOR WITH TORQUE LIMITING BRAKE

CROSS REFERENCE TO RELATED APPLICATION

This application claims benefit pursuant to 35 U.S.C. §119(e) of U.S. provisional application 61/834,646 filed Jun. 13, 2013, which is herein incorporated by reference in its entirety.

TECHNICAL FIELD

This invention relates to wind driven devices that are used for the production of electric power. This invention further relates to a wind turbine electric generator with a torque limiting brake used to prevent the occurrence of potentially damaging conditions during operation of the device. Such invention may be classified in U.S. class 290, subclass 44.

BACKGROUND

Wind driven electric power generating devices include one or more rotating blades that move in response to movement of the wind. The blades rotate a shaft at a rotational speed that varies in response to wind speed. The shaft that is directly rotated by the one or more blades of a wind turbine generally rotates at a relatively low velocity. For example, rotation at a rate of 10 to 60 rpm is common for many types of commercial wind turbine generators.

Electrical generators, which are sometimes alternatively referred to as dynamo electric machines, often have an armature or other rotating assembly that preferably rotates at a relatively high rotational speed compared to the rotational speed of the blades when producing electricity. Some common electrical generators preferably operate in the range of 600 to 1,800 rpm. Many types of wind turbine electrical generator systems include a gear box that operates to connect a shaft that is operatively connected to the turbine blades and rotates at the speed thereof, to the electrical generator. The gear box operates to step up the speed from the relatively low speed shaft which rotates at the speed of the turbine blades, and provides an output via one or more relatively high speed output shafts which shaft or shafts are operatively connected to the rotating assembly of a generator and which rotates at a speed that is suitable for the production of electricity.

Wind velocity is often highly variable, irregular and unpredictable. Wind velocity may rise and fall rapidly during gusty conditions. Such repeated rapid changes in wind speed, and the resulting force against the one or more turbine blades of a wind turbine electric generator, may result in excessive torque loading and/or torque spikes in the power transmission system, including the gear box. While the pitch of the blades of the wind turbine may be selectively changeable in many wind turbine electric generator systems, the pitch of the blades is generally not changed rapidly for dynamic or energy production reasons. As a result, blade pitch generally cannot be changed quickly enough to avoid excessive torque that results from wind gusts or highly rapidly varying wind conditions. Rather, systems which control the pitch of the blades will often take considerable time to change the blade pitch sufficiently to reduce torsional load spikes or other undesirable conditions. Many times load spikes, excessive torsional loads and other conditions which can damage components of the wind turbine will have impacted the gear box and other components before a change in pitch can be effective to avoid damage.

Further, when a wind turbine generator is operating efficiently and the generator is applying a resistance load to the high speed output shaft of the gear box, rapid changes in torsional force may be particularly damaging to gears, bearings and other components within the gear box. Such conditions may cause breakage and/or fatigue of shafts and gear teeth, which eventually results in failures of the gear box and connected components. Further in some arrangements, rapid changes in wind speed may cause increases in the rotational speed of the turbine blades and the generator to undesirable levels. Many types of wind turbines are not operated in sustained winds above 55 mph in order to avoid damage to the device components. In cases where the rotational speed of wind turbine blades has reached an undesirable level, a reduction in speed is generally achieved by changing the pitch of the blades. Because in such circumstances the blades and the other system components are rotating at an undesirable high speed, and because of inertial forces, a change in pitch of the blades will often take considerable time to achieve a reduction in the speed of the blades. Thus, considerable time is often required to slow down and/or stop the rotation of the blades.

While some wind turbine electric generator systems include a brake device for stopping and/or preventing rotation of one or more components of the system, such devices are generally configured only to stop and hold one or more shafts against relatively small rotational forces. Such mechanisms will generally operate to prevent the mechanism from rotating once a change in pitch of the turbine blades has been used to slow the rotational speed of the turbine blades. Conventional braking mechanisms cannot generally withstand an extended period of attempting to resist the force of the turbine blades at operating pitch and being rotated by high winds. Further in many conventional arrangements, the braking mechanisms apply braking and holding force on the high speed output shaft of the gear box. As a result, when the brake is engaged, torsional loading and potential gear box wind-up caused by the wind force acting on the wind turbine blades is applied to the gear box. Such conditions may cause fatigue and/or damage to internal gear box components as the gear box resists the torsional loading.

Wind turbine electric generators and related systems may benefit from improvements.

SUMMARY OF DISCLOSURE

An example arrangement of a wind turbine electric generator provides for more reliable operation and longer service life. The damaging effects of erratic high speed wind conditions and excessive torsional loading on components of the wind turbine generator are reduced by a power transmission system which includes a torque limiting brake that in example arrangements is operatively positioned between the low speed shaft connected to the wind turbine blades and the electric generator. The example torque limiting brake is operative to prevent the application of excessive torsional loads to the low speed gear box input shaft of the gear box. The avoidance of such excessive loads reduces the risk of damage and fatigue to the gear box components and other components of the wind turbine electric generator.

The exemplary arrangement further includes a torque limiting brake that provides selectively variable drag force to prevent the application of excessive torque to the low speed gear box input shaft. In the exemplary arrangement, the torque limiting brake is controlled by a system that determines at least one property that corresponds to the torsional force currently available to be applied to the low speed gear box input shaft. This is done in some example arrangements by measuring the current strain or other property that corresponds to force applied to one or more components, such as portions of the turbine blades, the pitch control system, the nacelle or other supporting structures, the blade hub, the low speed input shaft and/or in certain arrangements, a gear box mid speed shaft. A brake control circuit in an example arrangement includes at least one processor that operates in accordance with its programming to rapidly control a variable pressure fluid control valve or similar device so as to increase the drag force produced by the torque limiting brake to avoid the application of undesirable loads to the gear box.

In still other exemplary arrangements, sensors may be used that are operable to detect at least one property corresponding to future torsional force that may shortly be applied to the gear box. This may include in some arrangements, sensors such as Doppler radar sensors or Lidar systems that are capable of detecting wind velocities of approaching winds (or other weather conditions) that will soon be impacting the turbine blades. These Doppler and/or Lidar sensors can be used to acquire various weather conditions occurring remotely from the wind turbine, including wind speed, turbulence, wind veer, and wind shear data. Lidar can be used in different forms, including Doppler Lidar, Rayleigh Doppler Lidar, Harlie Lidar, Dial Lidar, etc. Lidar can be used in a remote sensing system to measure distance by illuminating a target with a laser and analyzing the reflected light. Doppler radar can be used to obtain velocity data by beaming a microwave signal toward a desired target and then listening for its reflection.

In the example arrangements, the brake control circuit may operate responsive to these sensed properties to cause the torque limiting brake to rapidly adjust the drag force so as to avoid the application of excessive torsional loading to the gear box and other downstream components.

In still other example arrangements, a torque limiting brake may operate to apply drag forces for extended periods of time so as to limit the applied torsional force to the gear box and also limit the speed of the wind turbine. The example torque limiting brake may operate for extended periods of time in example embodiments by providing liquid cooling of the brake components which generate heat in resisting the rotational forces. Such liquid cooling enables the torque limiting brake to act for extended periods without loss of effectiveness. In such example arrangements, the torque limiting brake through the relatively continuous application of drag forces may enable the wind turbine to operate in higher wind conditions and/or in other conditions that would otherwise be intolerable. Further in some example embodiments, the variable drag force may be changed as necessary even during periods when the torque limiting brake is acting to maintain a slowed wind turbine speed. This capability enables the example arrangements to avoid the harmful effects of gusts and other erratic variations that occur during conditions of generally continuous high wind speeds by providing a dampening effect that reduces the frequency and amplitude of load variations that act on the gear box and other components.

Example arrangements may operate one or more torque limiting brakes not only to maintain torque applied to the input shaft of the gear box below a threshold, but also to avoid rotational speeds that are above desired thresholds. Further, multiple torque limiting brakes may be configured to act on different rotating members of the wind turbine electric generator so as to apply rotation limiting forces in various areas of the assembly. Such configurations in example embodiments may provide additional torque limiting and speed limiting capabilities which can operate to effectively apply variable drag forces for extended periods. Further, such distributed drag force application areas within the rotational power transmission mechanisms of the wind turbine electric generator may reduce the impact of spikes and other torsional loading more effectively than the use of a single braking device.

In still other example arrangements, a synchronization controller operates to cause a pitch control system to operate in concert with a brake control system during a braking operation. The synchronization allows the brake control system to be operated without triggering unwanted adjustments of the wind turbine blade pitch angle by the wind turbine pitch control system. In an exemplary embodiment, the synchronization controller prevents the pitch control system from trying to increase rotational speed of the turbine blades in direct response to the blades being slowed due to the brake control system applying braking to a low speed gear box input shaft.

These and other benefits of example embodiments will be made apparent from the following detailed description.

BRIEF DESCRIPTION OF DRAWINGS

FIG. 13 shows an exemplary brake synchronization interface arrangement which allows a pitch control system to be fed either an actual or an estimated shaft speed.

FIG. 14 shows operation of the synchronization interface during a braking operation, where the pitch control system is fed an estimated shaft speed.

FIG. 15 shows operation of the synchronization interface during an absence of a braking operation, where a selector switch causes actual shaft speed to be fed to the pitch control system.

DETAILED DESCRIPTION

Figure 1:
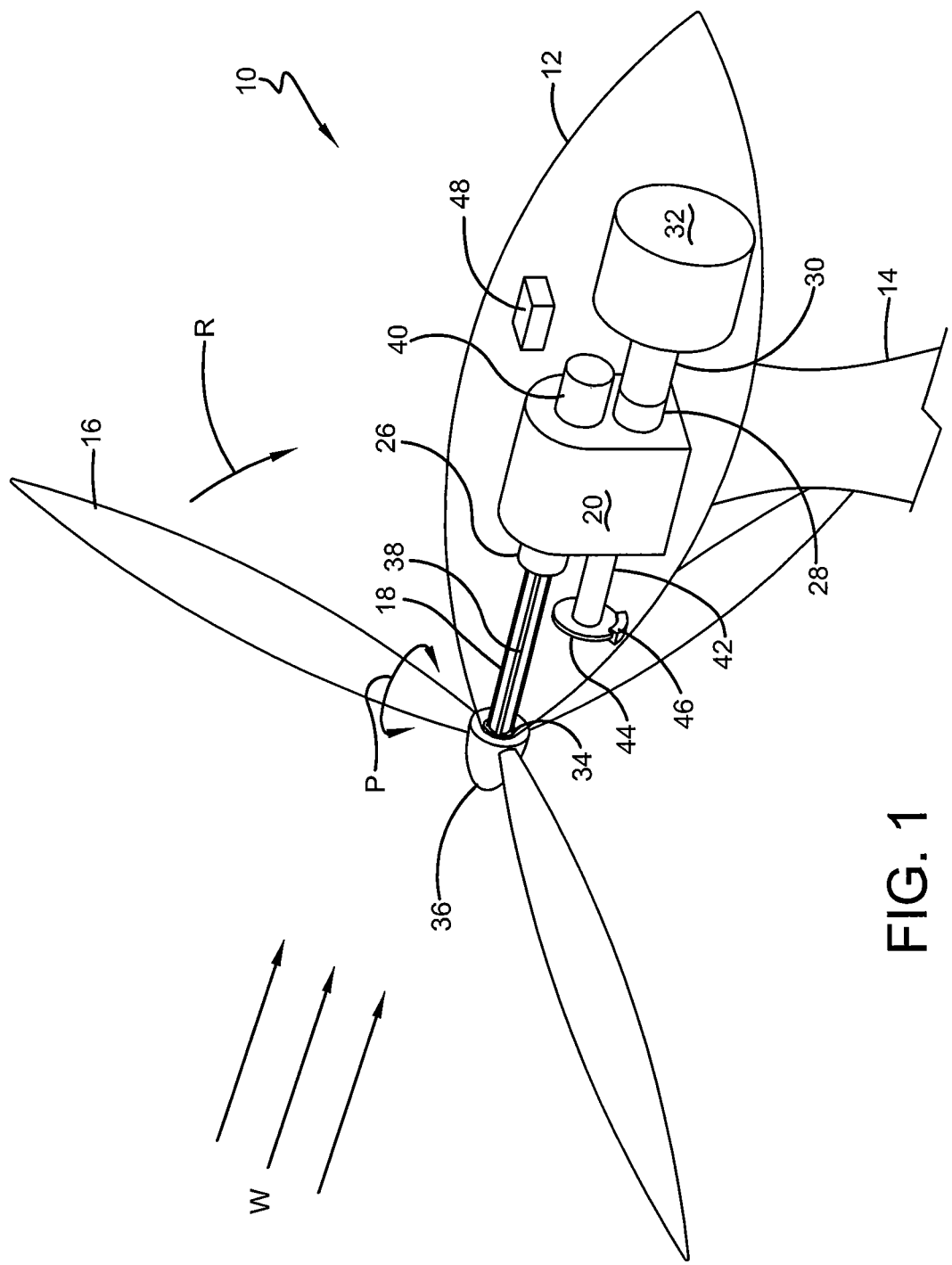
FIG. 1 is an isometric transparent schematic view of an example wind turbine electric generator.

Referring now to the drawings and particularly to FIG. 1, there is shown therein a wind turbine electric generator generally indicated 10. The example wind turbine electric generator has components housed in a nacelle 12 which is shown as transparent. The nacelle is supported above the ground on a pedestal 14. Although in this example arrangement, the nacelle is shown in a fixed orientation relative to the pedestal, it should be understood that in other arrangements the nacelle may be movable and/or rotatable relative to the pedestal through suitable support and movement mechanisms.

The example wind turbine electric generator includes a plurality of wind turbine blades 16. While in the exemplary arrangement a plurality of discrete propeller type blades are shown, it should be understood that other embodiments may include different types of blade arrangements. These may include for example, helical blades, vertical blades, circumferentially bounded fan blades or other types of blade arrangements that are operative to produce a rotational mechanical output in response to wind force. In the exemplary arrangement, the blades 16 rotate in the direction of arrow R responsive to wind flow represented by arrows W.

In the exemplary arrangement, the blades are operatively attached to a low speed shaft 18. In the exemplary arrangement, the low speed shaft is a generally hollow shaft for reasons that will be later explained. The low speed shaft 18 rotates at a rotational velocity corresponding to the rotational speed of the blades. In some example arrangements, the speed of the low speed shaft is generally desirably limited to below a maximum for purposes of avoiding excessive speeds that may be damaging to components of the wind turbine electric generator. The desired maximum rotational speed for a given wind turbine electric generator will depend on the construction of the particular apparatus. For some such devices, a maximum of about 60 rpm is desirable. However, in larger devices, maximum may be lower. Depending on the size, the rotational speed of the low speed shaft 18 and connected blades may be desirably limited to 25 to 30 rpm or less. Of course, this approach is exemplary and in other arrangements other approaches may be used.

In the example arrangement, the low speed shaft 18 is operatively connected to a gear box 20. In an exemplary arrangement, the low speed shaft 18 is operatively connected to a low speed gear box input shaft 22 of the gear box 20 (see FIG. 6). In the exemplary arrangement, the low speed gear box input shaft 22 is a hollow shaft into which the low speed shaft 18 extends in concentric telescoping relation. The exemplary low speed shaft 18 and low speed gear box input shaft 22 are held in operative connection through one or more couplings 24. In the exemplary arrangement, the coupling 24 is operative to apply a radially directed compressive force to the outside diameter of the low speed shaft, either directly or indirectly, so as to hold the low speed gear box input shaft 22 and the low speed shaft 18 in generally fixed connection. That is, the coupling 24 can create a radially compressive connection. For example, the coupling arrangement 24 can comprise a shrink disc and/or a clamping device. A shrink disc 24 can provide increasing radially directed force responsive to tightening of multiple fasteners, which pull separate pieces of the shrink disc together and force a wedge-shaped element radially inward. Of course it should be understood that these connection approaches are exemplary, and in other arrangements other types of couplings may be used.

As shown schematically in FIG. 1, the exemplary wind turbine electric generator includes an in-line torque limiting brake 26. The exemplary torque limiting brake is operative to provide selectively variable drag force that maintains the torsional force that is applied to the low speed gear box input shaft 22 below a threshold. Example embodiments of torque limiting brakes and systems for control thereof are later described in detail.

The gear box 20 includes a high speed gear box output shaft 28. The high speed gear box output shaft rotates at a substantially higher rotational speed than the low speed gear box input shaft 22. The high speed gear box output shaft of example embodiments generally desirably rotates during operation at about 600 to 1,800 rpm. The speed range utilized is a generally suitable rotational speed for the rotating assembly of the electric generator used in example embodiments. Of course it should be understood that this speed range is exemplary, and in other arrangements other speeds may be advantageously utilized. Further in some exemplary arrangements, wind turbine electric generators have a plurality of output shafts from the gear box arrangement utilized. Some such arrangements include one or more mid speed, as well as high speed output shafts. These output shafts may be used to rotate, directly or indirectly, the rotating assemblies of one or more electric generators. For purposes of this disclosure, a high speed gear box output shaft shall be deemed to include such mid speed gear box output shafts, as well as high speed gear box output shafts or other output shaft arrangements that rotate at a speed higher than the low speed gear box input shaft 22 that is driven from the rotating blade arrangement.

In the example arrangement shown, the high speed gear box output shaft 28 is operatively connected to a high speed shaft 30. The high speed shaft 30 is in operative connection with an electric generator schematically indicated 32. The high speed shaft 30 is operative to cause rotation of the rotating assembly such as an armature of the electric generator 32 so as to cause the generator to produce electricity.

In the exemplary embodiment that is schematically shown, the pitch of the blades 16 is selectively variable. Of course it should be understood that not all wind turbine electric generators have blades with variable pitch, and further that variable pitch blades are not required to obtain certain of the benefits that are described in connection with the features disclosed herein. In the example arrangement, the pitch of the blades is changed by rotation of the base of the blade along the direction of arrow P as shown. Varying the pitch of the blades changes the blade attack angle relative to the prevailing wind. In the example arrangement, by varying the pitch of the wind turbine blades, the amount of torque and speed produced by the turbine blades can be selectively varied. In the exemplary arrangement, a mechanism such as a gear arrangement 34 in the blade hub 36 is operated to selectively vary the pitch of the blades. In the exemplary arrangement, the pitch gear arrangement is moved responsive to a pitch control shaft 38 that extends through the hollow low speed shaft 18, as well as the torque limiting brake 26 and the gear box 20.

In the exemplary arrangement, movement of the pitch control shaft 38 is controlled responsive to one or more actuators indicated 40. In some exemplary arrangements, the pitch control system may include an electrically actuated system. In such systems, the pitch control actuator may include an electrical servo motor or other electrical actuator that operates to move and change the pitch of the wind turbine blades responsive to electrical signals. In some arrangements, an electrical actuator may operate to turn a gear actuated mechanism as shown, while in other arrangements electrical actuators may be housed in other locations, such as in the blade hub which supports the blades and may operate to more directly control movement of the blades. Further, in some example arrangements, all of the blades may be operated to change pitch in response to a common electrical actuator while in other arrangements a separate electrical actuator may be associated with each of the blades. Numerous different types of electrical actuator arrangements may be utilized, depending on the particular configuration of the blades and the wind turbine electric generator involved.

In other example arrangements, the pitch control actuator may include a hydraulic actuator, such as a hydraulic rotary actuator. In such example arrangements, the pitch control actuator may move responsive to fluid pressure that is applied in a controlled manner so as to change the pitch of the blades. In some example arrangements, the hydraulic actuator may operate to rotate a common mechanism, which changes the pitch of multiple blades. In still other exemplary arrangements, a separate hydraulic actuator may be associated with each of the blades such that each may be controlled individually. In still other exemplary arrangements, hydraulic devices other than a rotary actuator may be used. These may include for example, hydraulic cylinders or other suitable movement mechanisms that are operatively engaged with the blades so as to change the pitch thereof. In still other arrangements, pneumatic, electronic or other types of pitch control systems and associated actuators may be utilized for purposes of changing blade pitch.

In the exemplary arrangement schematically shown, a high speed shaft extension 42 extends from the gear box 20 on a side opposed of the high speed gear box output shaft 28. The high speed shaft extension 42 in exemplary embodiments is in operative connection with the high speed gear box output shaft 28 and rotates therewith. The exemplary high speed shaft extension 42 is in operative connection with a brake disc 44. A brake caliper 46 is positioned operatively adjacent to the brake disc 44. The brake caliper is selectively operative to engage the brake disc so as to hold the brake disc and the connected high speed shaft in a fixed and stopped condition. In the exemplary arrangement, the brake caliper is usable to stop and hold the high speed shaft 28 and the gear box, as well as the low speed shaft 18 and turbine blades, in a stopped condition. In some example arrangements, the brake caliper may be actuated hydraulically, electrically or in another suitable manner sufficient to provide the needed force to hold the connected components in a stopped condition. The brake caliper 46 in the exemplary embodiment is sufficient to do this acting alone only in cases where the forces acting on the turbine blades are relatively low.

In the exemplary arrangement, the wind turbine electric generator includes control circuitry schematically indicated 48. In the exemplary embodiment, the control circuitry 48 operates to control the components of the wind turbine electric generator of the exemplary embodiment. This includes control of components associated with the electric generator that may be necessary for the efficient production of electricity. The control circuitry may also be utilized to control the pitch control system, the disc brake caliper, and other components of the wind turbine electric generator. It should be understood that in exemplary embodiments the control circuitry 48 includes one or more processors and data stores so as to provide programmed control for numerous systems and subsystems that operate as part of the wind turbine electric generator. Further, exemplary arrangements may include numerous other types of systems and devices, some of which are discussed hereafter, that are used in connection with the operation of the example wind turbine electric generator described herein. Various types of control circuitry may be employed as appropriate to control the devices of the particular example embodiments.

Figure 2:
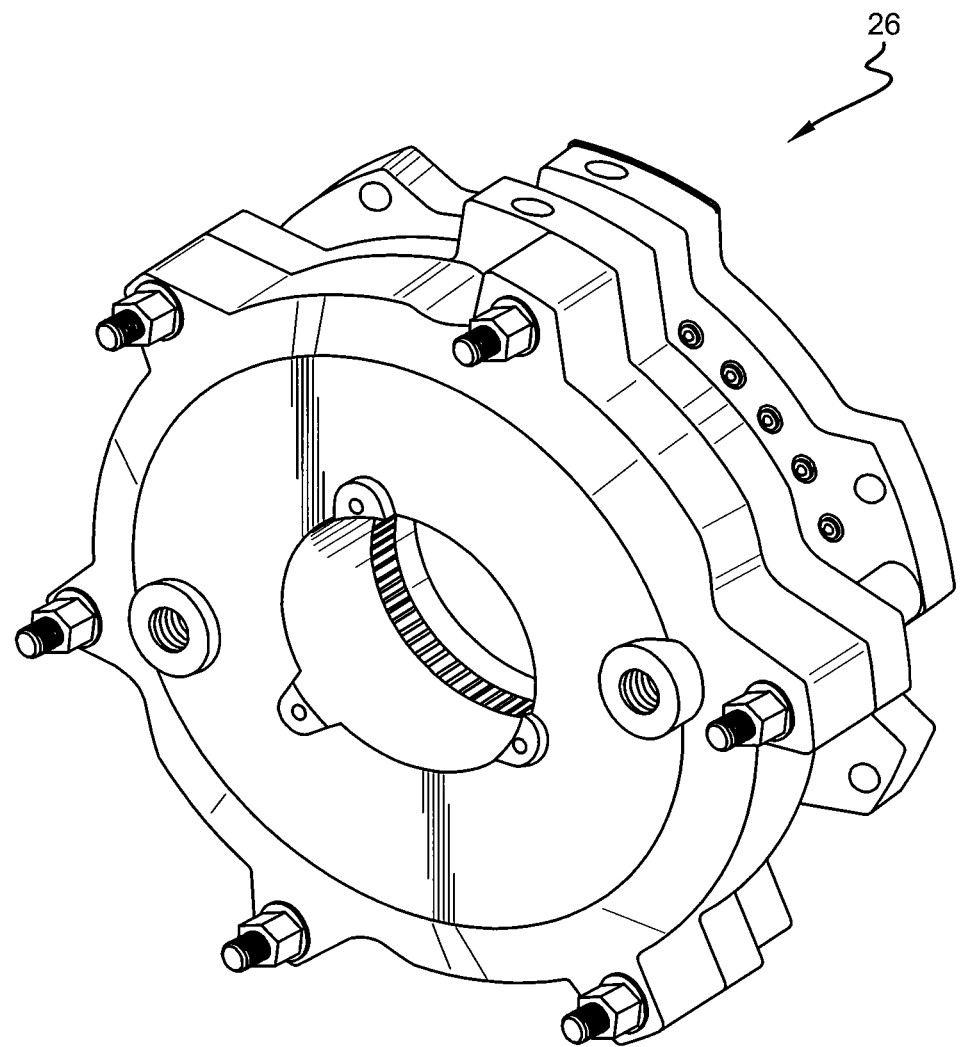
FIG. 2 is an isometric view of an exemplary torque limiting brake that may be used in some example embodiments.

FIG. 2 shows an example of a torque limiting brake 26 used in some example embodiments. The example torque limiting brake comprises a fluid cooled brake, such as an Airflex® water cooled brake sold by Eaton Corporation. Such torque limiting brakes of the exemplary embodiment provide precise control of applied drag and are suitable for use in continuous slip applications where drag force may be continuously applied for extended periods of time. The exemplary arrangement of the torque limiting brake provides selectively variable drag force that can be rapidly changed in response to varying torque conditions. Further, the example arrangement enables drag force to be applied during normal operating conditions of the wind turbine electrical generator continuously for extended operational periods without adverse wear effects or reduction in drag application capabilities. Of course it should be understood that these arrangements are exemplary, and in other embodiments other arrangements and configurations may be used.

Figure 3:
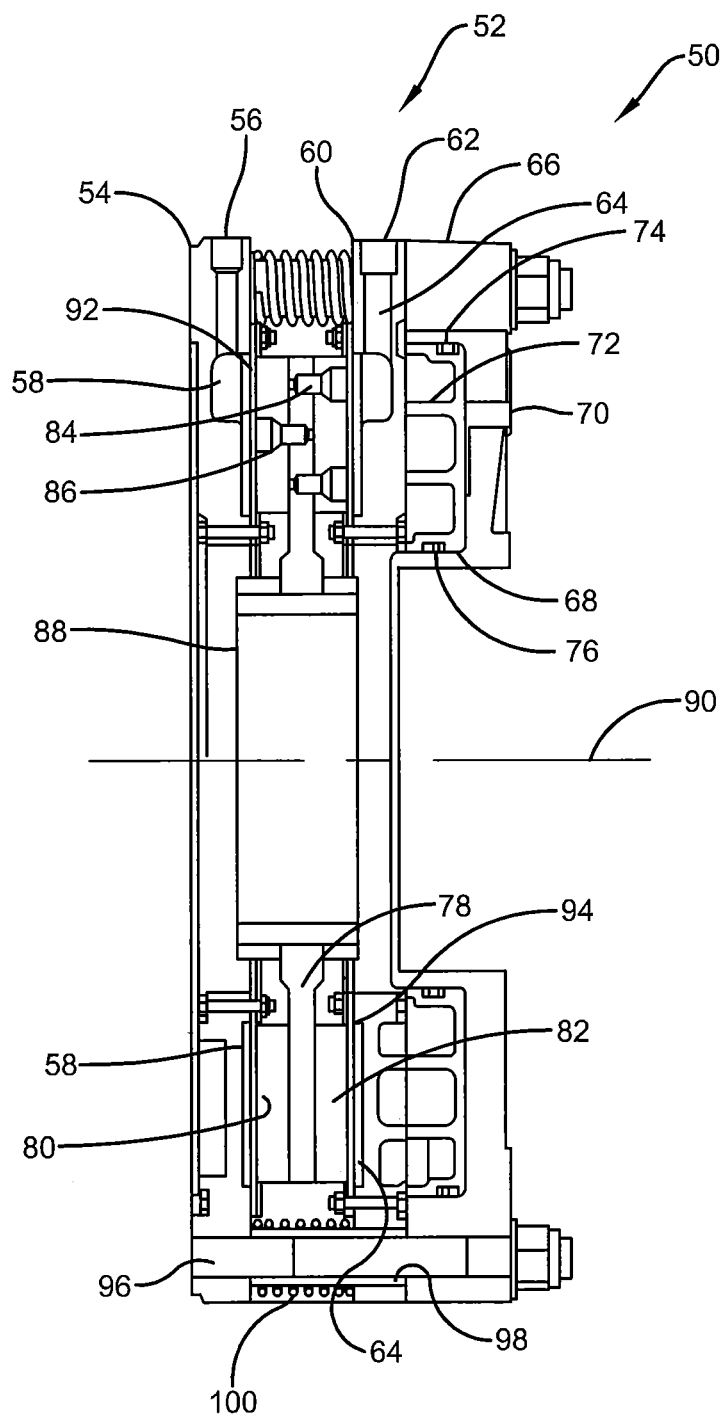
FIG. 3 is a cross-sectional view of a first example of a torque limiting brake that is usable in some example arrangements.

FIG. 3 shows a first example embodiment of a torque limiting brake that may be used in some arrangements. This example torque limiting brake which is generally indicated 50, includes a body generally indicated 52. Body 50 includes a first body portion 54. First body portion 54 includes a generally annular body portion. Body portion 54 includes a coolant port 56. Coolant port 56 is in fluid communication with a plurality of fluid tight liquid passages schematically indicated 58 that extend in the body portion. In the example arrangement, the fluid tight passages 58 conduct liquid coolant material between an inlet coolant port and an outlet coolant port on the body portion. Coolant port 56 in the exemplary embodiment may serve as either the inlet port or the outlet port. The second coolant port on the body portion is not separately shown. In the exemplary arrangement, the fluid passages 58 extend annularly about the body so as to provide cooling and to carry away heat that is generated in operation of the torque limiting brake.

The exemplary torque limiting brake 50 further includes a second body portion 60. Body portion 60 of the example embodiment comprises a generally annular body portion. Body portion 60 also includes coolant inlet and outlet ports, one of which ports 62 is shown. The coolant ports in body portion 60 are connected to fluid tight passages 64.

The exemplary torque limiting brake 50 further includes a third body portion 66. Third body portion 66 is a generally annular body portion. Body portion 66 includes a generally annular cavity 68. Annular cavity 68 is in operative connection with a fluid pressure port 70 to which brake fluid pressure can be applied.

A movable member comprising an annular piston 72 is movably mounted in the cavity 68. Piston 72 is in operative connection with peripheral resilient seals 74 and 76. Seals 74 and 76 prevent the passage of fluid between the outer surface of the piston and the bounding wall of the annular cavity 68. As a result in the exemplary arrangement, the application of brake fluid pressure such as pneumatic pressure to the fluid pressure port 70 is operative to cause movement of the piston 72 in an inward direction into biasing engagement with body portion 60. Body portion 60 is moved to the left as shown in FIG. 3 as the piston moves inward. The piston is movable outward as fluid pressure is relieved from the fluid pressure port. Of course it should be understood that while in the exemplary arrangement pneumatic pressure is utilized to move the annular piston, in other arrangements other fluids may be used for this purpose. These may include for example, hydraulic fluid, liquid coolant, transmission fluids or other suitable available fluids that can be supplied at elevated pressures to perform the described functions.

The exemplary brake 50 includes a rotatable disc 78. Disc 78 includes friction pads 80 and 82 mounted on opposed axial sides thereof. Exemplary friction pads 80 and 82 are arcuate in configuration and are held in attached engagement with the rotatable disc 78 through fasteners 84 and 86 as shown. Multiple friction pads are attached to the disc sides to provide a generally continuous annular friction surface on each side of the disc. Of course these approaches for the friction material and for holding the friction material in engagement with the rotatable disc are exemplary, and in other embodiments other approaches may be used.

In the exemplary arrangement, the rotatable disc 78 is in operatively engaged relation with a hub 88. Hub 88 of the example embodiment includes a splined outer surface. An inner diameter of the rotating disc 78 is configured to engage the splined outer surface of the hub and to be relatively movable with respect thereto in engagement with the splines in a direction parallel of an axial direction that corresponds to the axis of rotation of the hub generally indicated 90. In the exemplary arrangement, the inner diameter of the hub may be a splined surface, a keyed surface or other suitable configuration for providing a secure attachment to a shaft to which the brake is engaged.

In the exemplary arrangement, body portion 52 is in operative connection with a wear plate 92. Wear plate 92 is configured to operatively engage friction pad 80 that is attached to the rotating member when the brake is engaged. Body portion 60 is in operative connection with a wear plate 94. Wear plate 94 is configured to engage friction pad 82. As shown, the wear plates of the exemplary embodiment are disposed adjacent to the liquid coolant passages so the heat generated at the interfaces of the friction pads and the wear plates is transmitted to the coolant and dissipated by the flow of coolant through the fluid passages. This cooling effect helps to maintain the bodies and the friction pads at a suitable temperature so that drag force can be applied for extended periods of time without damaging heat build up. Of course these configurations are exemplary, and in other embodiments other approaches may be used.

In the exemplary arrangement, a plurality of studs 96 extend between the first, second and third body portions of the torque limiting brake. In the exemplary arrangement, the studs 96 engage body portion 54 in threaded engagement. Body portion 60 includes apertures 98 through which the studs extend. Apertures 98 enable body portion 60 to move in a direction parallel to axis 90 relative to the studs. A plurality of compression springs 100 extend operatively intermediate of the body portions 54 and 60. Springs 100 operate to bias the body portions apart and thus bias the friction pads attached to the rotating disc 78 away from the wear surfaces.

In the exemplary arrangement, the application of fluid pressure through fluid pressure port 70 operates to move annular piston 72 inwardly in a direction parallel to axis 90. As piston 72 moves to the left as shown in FIG. 3, it applies a force against body 60. The force applied by the brake fluid pressure overcomes the force of the springs 100 and causes the wear plate 94 attached to body 60 to be moved to engage friction pad 82 attached to disc 78. The brake fluid pressure and movement of piston 72 cause the rotating disc 78 to move on the outer splined surface of the hub such that the friction pads attached to the rotating member are in clamped sandwiched engagement between the wear plates 92 and 94 on body portions 54 and 60, respectively. The clamping force applied by the brake fluid pressure causes a rotational drag force corresponding to the applied fluid pressure on the rotating member. As can be appreciated, the drag force operates to resist rotational movement of the rotating member. The drag force can be effectively varied rapidly by changing the brake fluid pressure applied to the fluid pressure port. Of course it should be understood that this approach is exemplary, and in other arrangements other configurations may be used.

Figure 4:
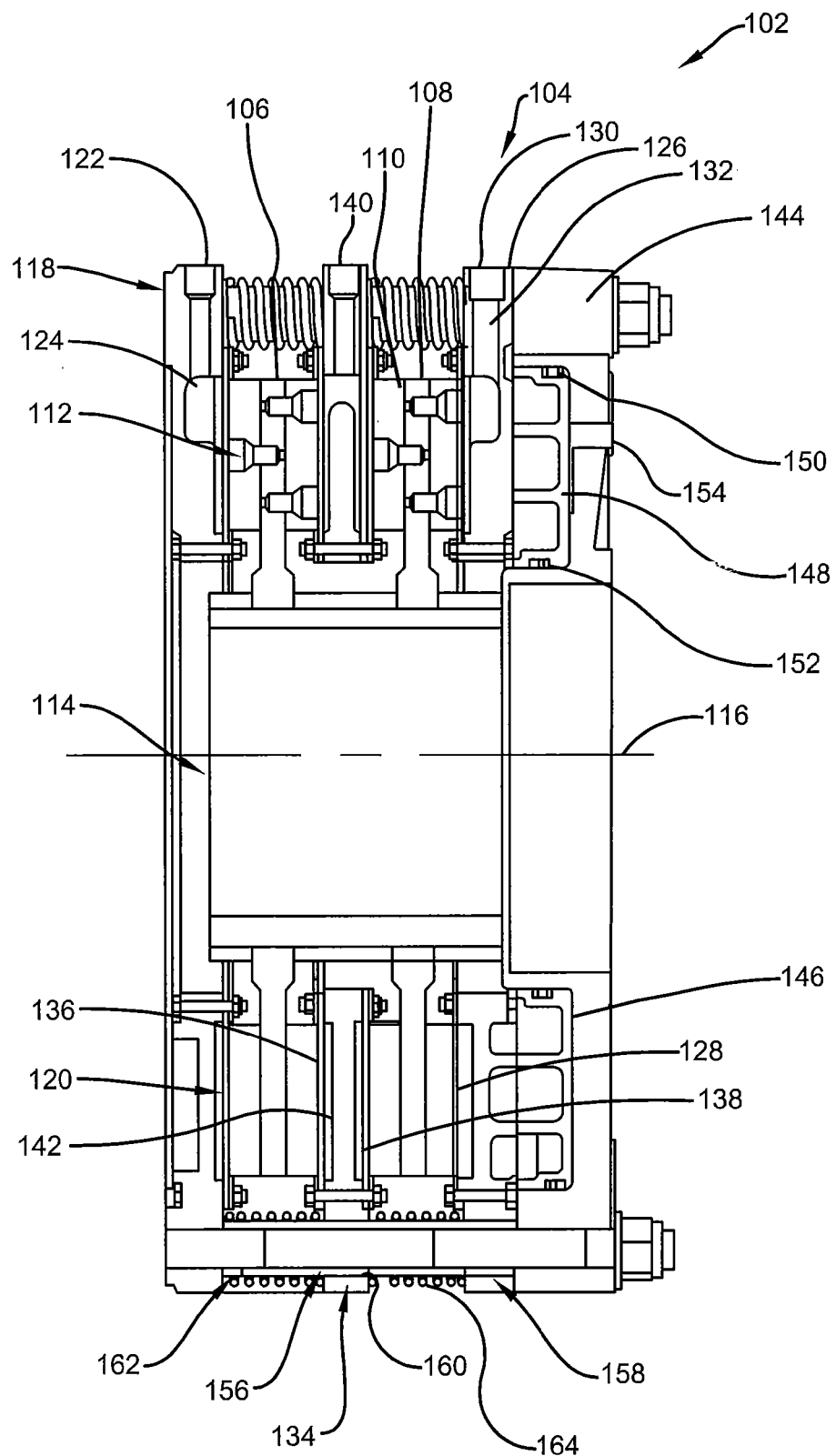
FIG. 4 is a cross-sectional view of an alternative torque limiting brake that may be used in some example arrangements.

FIG. 4 shows another alternative torque limiting brake, which may be used in some embodiments of the wind turbine electric generator. The torque limiting brake shown in FIG. 4 generally indicated 102 is generally similar in its principles of operation to torque limiting brake 50. However, torque limiting brake 102 includes a body generally indicated 104 that houses multiple rotating disc members 106 and 108. Rotating disc members include friction pads generally indicated 110 attached on each opposed axial side thereof in a manner like the torque limiting brake previously described. Each of the friction pads is held in engagement with the rotating members through fasteners 112. The rotating members 106 and 108 are operatively engaged with a rotatable hub 114, which rotates generally about an axis 116. In the exemplary arrangement, the hub 114 includes a splined outer surface that corresponds to the configuration of the inner surfaces of the discs, and each of the rotating disc members is movable thereon in a direction parallel to the axis in engagement with the splines. In the exemplary arrangement, the inner diameter of the hub 114 may be splined or otherwise have a suitable configuration for engagement with a brake shaft or similar member.

In the exemplary arrangement of torque limiting brake 102, a first body portion 118 includes a wear plate 120 that is configured to engage the friction pads on the left axial side of rotating disc 106 as shown. First body portion 118 includes inlet and outlet coolant ports 122 in fluid connection with fluid tight liquid passages 124 in a manner like those previously discussed.

A second body portion 126 includes a wear plate 128 that is configured to engage the friction pads in operative connection with disc 108 on the right side of disc 108 as shown. Body portion 126 includes coolant ports 130 for accepting and discharging liquid coolant or other cooling material in a manner like that previously discussed. Body portion 126 further includes a plurality of fluid passages 132 that connect the coolant inlet and outlet ports, and in the example arrangement enables cooling liquid to flow therethrough.

Torque limiting brake 102 further includes a third body portion 134. Body portion 134 comprises a movable reaction plate. Body portion 134 includes wear plates 136 and 138. Wear plates 136 and 138 are configured to engage the friction pads attached to rotating discs 106 and 108, respectively. Body portion 134 further includes coolant ports, including coolant inlet and outlet ports represented by a port 140. Coolant ports are in operative connection with cooling fluid passages 142 similar to those previously discussed. As a result, coolant can flow through body portion 134 so as to carry off heat generated by the friction pad material acting at the wear plates. Of course it should be understood that this configuration is exemplary, and in other embodiments other approaches may be used.

Body 104 of torque limiting brake 102 further includes a fourth body portion 144. Body portion 144 may be similar to body portion 66 previously described. Body portion 144 includes an annular cavity 146 in which a movable member comprising an annular piston 148 is movably mounted. Seals 150 and 152 provide for movable fluid tight engagement between the piston 148 and the adjacent walls bounding the cavity 146. The cavity 146 is in fluid communication with a fluid pressure port 154. Brake fluid pressure applied to the fluid pressure port enables movement of the piston 148 in the cavity so as to provide selectively variable drag force to the rotating discs and the hub in a manner like that previously described.

In the exemplary arrangement, the body portions of torque limiting brake 102 are connected through a plurality of studs 156. Body portions 126 and 134 include apertures 158 and 160 respectively, through which the studs extend. Apertures 158 and 160 are sized to enable movement of body portions 126 and 134 in a direction generally parallel to the axis 116. Compression springs 162 and 164 extend operatively intermediate of body portions 118 and 134, and body portions 134 and 126 respectively. Spring 162 biases body portion 134 away from body portion 118. Likewise, spring 164 biases body portion 126 away from body portion 134. Thus, as in the previously described torque limiting brake, the compression springs operate to disengage the friction pads and the wear plates so as to release the drag force when brake pressure is not being applied.

Similar to the previously described torque limiting brake 50, brake 102 operates to apply a drag force resisting rotation of the rotating discs and the hub 114, responsive to fluid pressure applied to fluid pressure port 154. Brake fluid pressure applied to port 154 operates to cause the movable member comprising the annular piston 148 to move to the left as shown in FIG. 4. The piston moves body portion 126 to the left as shown and causes discs 106 and 108 to be squeezed in sandwiched relation between the friction pads attached to the rotating discs and body portions 126, 144 and 118. The torque limiting drag force applied to the discs can be varied responsive to the brake fluid pressure applied at the fluid pressure port. The additional friction pads and brake surface area of torque limiting brake 102 enables the application of greater torque limiting force than brakes with lesser pad area and less force application area. In addition, the cooling capability provided to the torque limiting brake enables operation of the torque limiting brake in the applied condition for extended periods and under heavy loading conditions, without adverse effects on the torque limiting brake's capabilities. Of course it should be understood that these approaches are exemplary, and in other embodiments other approaches may be used.

Figure 5:
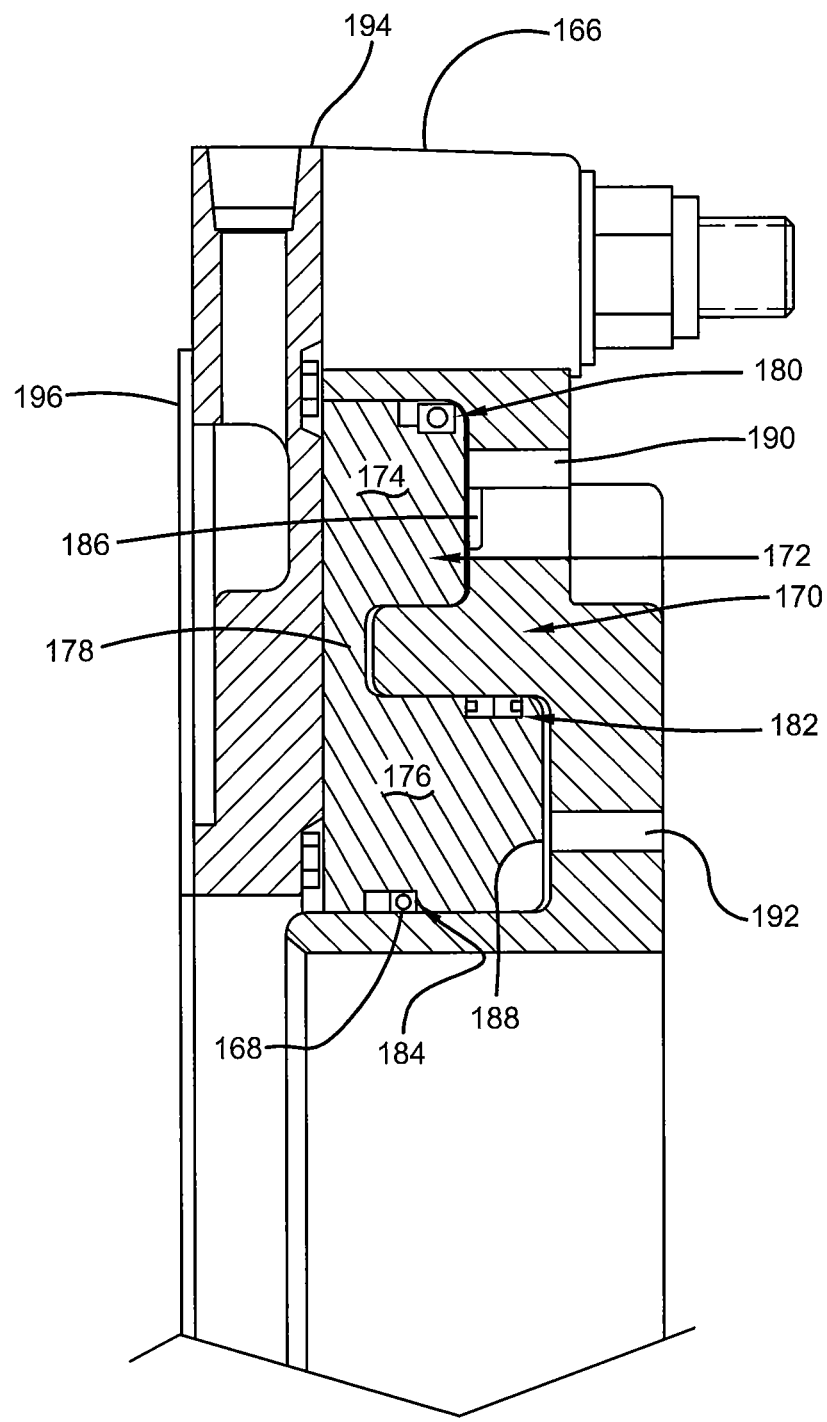
FIG. 5 is a cross sectional view of a dual piston arrangement that may be used in connection with the example torque limiting brakes.

FIG. 5 shows an alternative arrangement of a piston that may be used in torque limiting brakes of exemplary embodiments. This piston is a dual piston that includes multiple fluid chambers through which brake fluid pressure can be applied. In this exemplary arrangement, a body portion 166 includes a generally annular piston bore 168. The generally annular piston bore includes an extended middle section generally indicated 170.

The piston 172 includes a pair of disposed generally annular body portions 174 and 176 that are separated by a reduced area 178 that generally conforms with the contour of the extending portion. Seals 180, 182 and 184 operatively engage the piston and the piston bore in slidable fluid tight engagement. The seals divide the piston bore into separate chambers generally indicated 186 and 188. Chamber 186 is in fluid communication with a fluid pressure port 190, and chamber 188 is in fluid communication with a fluid port 192. Fluid ports 190 and 192 may have brake fluid pressure applied thereto so as to move piston 172 to the left as shown in FIG. 5. The movement of piston 172 to the left enables movement of body portion 194 and its connected wear plate 196 in a manner like that previously discussed so as to provide braking force against an adjacent rotating disc.

The exemplary arrangement which includes multiple piston cavities, may allow the application of greater torque limiting forces and result in more effective application of drag forces. Of course it should be understood that these configurations are exemplary, and in other embodiments other configurations of braking pistons and other members to apply force through the torque limiting brake may be utilized.

Figure 6:
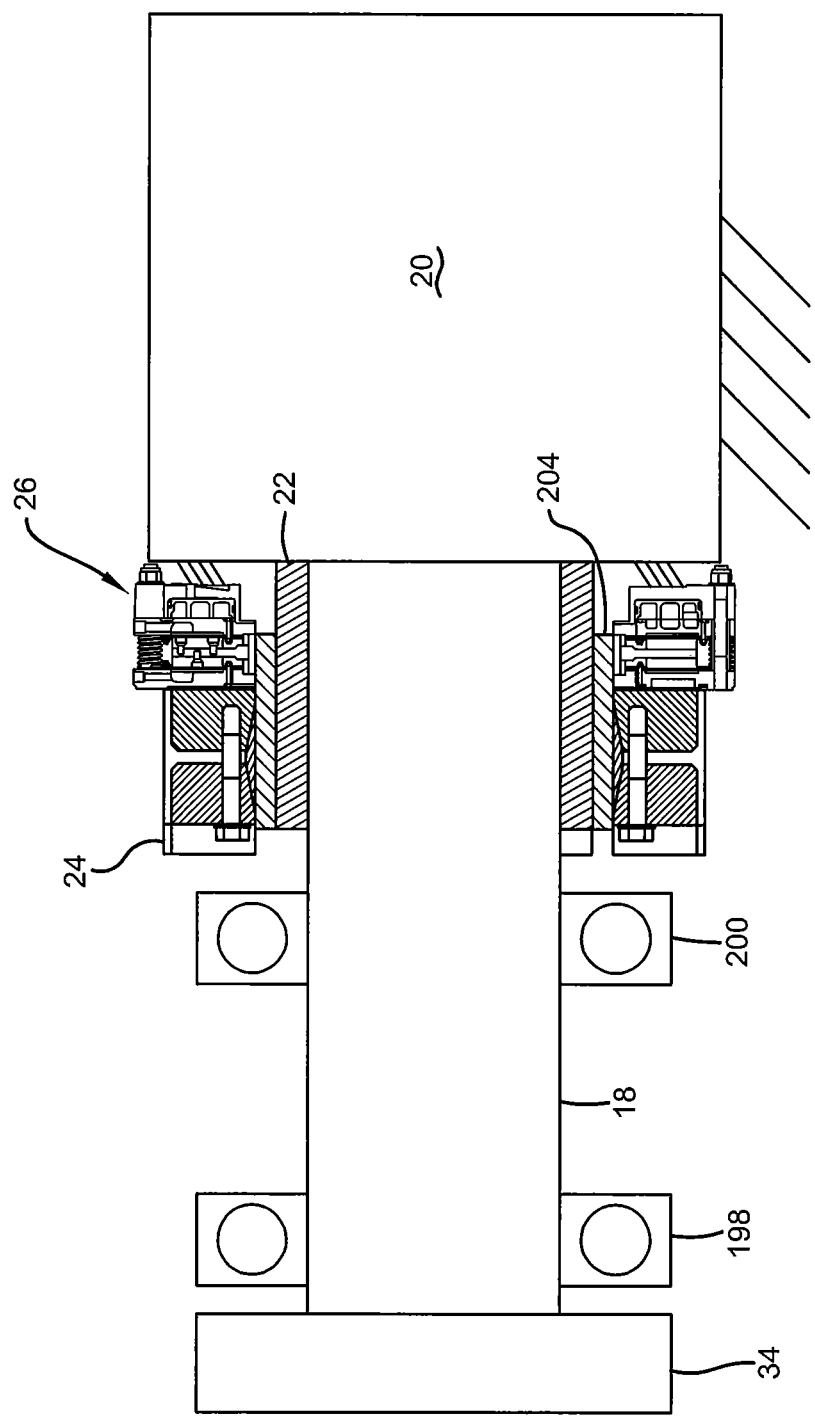
FIG. 6 is a schematic view of a first example of a mechanical arrangement of a wind turbine electric generator with a torque limiting brake.

FIG. 6 shows an example of an arrangement in which a torque limiting brake is in operative connection with a wind turbine electric generator. FIG. 6 shows schematically some of the components described in FIG. 1. Many of the components of the wind turbine electric generator are not shown in this Figure to facilitate the explanation regarding the torque limiting brake.

In this exemplary arrangement, the low speed shaft 18 is shown supported by a pair of bearing supports 198 and 200. In the exemplary arrangement, the bearing supports may comprise roller bearings, bushings or other suitable support for the low speed shaft within the nacelle that provides the low speed shaft the capability to rotate generally freely in response to the forces imparted on the turbine blades 16. In this exemplary arrangement, the low speed gear box input shaft 22 receives the low speed shaft 18 in telescoping concentric relation. In the example arrangement, the low speed shaft 18 has an inner diameter of approximately 30 inches or larger. Of course this arrangement is exemplary, and in other embodiments diameters will vary and other arrangements may be used.

In the arrangement shown in FIG. 6, the torque limiting brake 26 is of the single rotating disc type similar to torque limiting brake 50 shown in FIG. 3. Of course it should be understood that other types of torque limiting brakes such as torque limiting brake 102 may alternatively be used. In the exemplary arrangement, the torque limiting brake is attached in anchored connection to at least one of the structures in the nacelle such that at least one body portion of the torque limiting brake is in a fixed position relative to the gear box. In some arrangements, the torque limiting brake 26 may be fastened to structures connected to the gear box. Alternatively, the torque limiting brake may be fastened to other structures.

In the exemplary arrangement, the hub of the torque limiting brake is in connection with a brake shaft 204. The exemplary brake shaft 204 overlies the low speed gear box input shaft 22 in telescoping relation. In the exemplary arrangement, the brake shaft 204 may include a splined portion in the area of the hub of the torque limiting brake to facilitate connection thereto. In other arrangements, connecting arrangements such as a clamping arrangement may be utilized to provide such connections. Of course alternative approaches for connecting the brake shaft and the hub of the torque limiting brake may be used, depending on the particular configuration thereof.

In an exemplary arrangement, a shrink disc coupling 24 is utilized for purposes for holding the low speed gear box input shaft 22, the brake shaft 204 and the low speed shaft 18 in engaged relation. The shrink disc is utilized to provide compressive force which holds the telescope portions of each of the three shafts in engaged relation. Radial compressive force applied by tightening of the shrink disc 24 is effective to hold each of the low speed shaft 18, the low speed gear box input shaft 22 and the brake shaft 204 in engagement. Thus, the shrink disc serves as a coupling in connection with the shafts.

As can be appreciated, the torque limiting brake 26 in this exemplary arrangement has its brake shaft in operatively fixed connection with the coupling and the low speed gear box input shaft 22. As a result, actuation of the torque limiting brake by applying fluid pressure to the fluid pressure port thereof applies a drag force, which resists rotation of the low speed gear box input shaft 22. Further, the application of this drag force effectively limits the torsional force that is applied to the low speed gear box input shaft 22 to an amount that is below a threshold which maintains the force within the acceptable range for the operation thereof. This is accomplished in the exemplary arrangement through brake control circuitry that operates in a manner that is hereinafter discussed.

Further, as can be appreciated the exemplary torque limiting brake may apply drag force on a generally continuous basis. This may be done for example at times when the torsional force that is available from the wind turbine blades 16 and the low speed shaft 18 is in excess of torsional force that could be accommodated by the gear box without potential adverse effects. Such drag force may be particularly useful in preventing torsional spikes or wide fluctuations in torque or speed that result from wind gusts or other erratic wind conditions. Thus, the exemplary arrangement of the torque limiting brake enables the torque that is actually applied to the low speed gear box input shaft 22 to below a set threshold.

Figure 7:
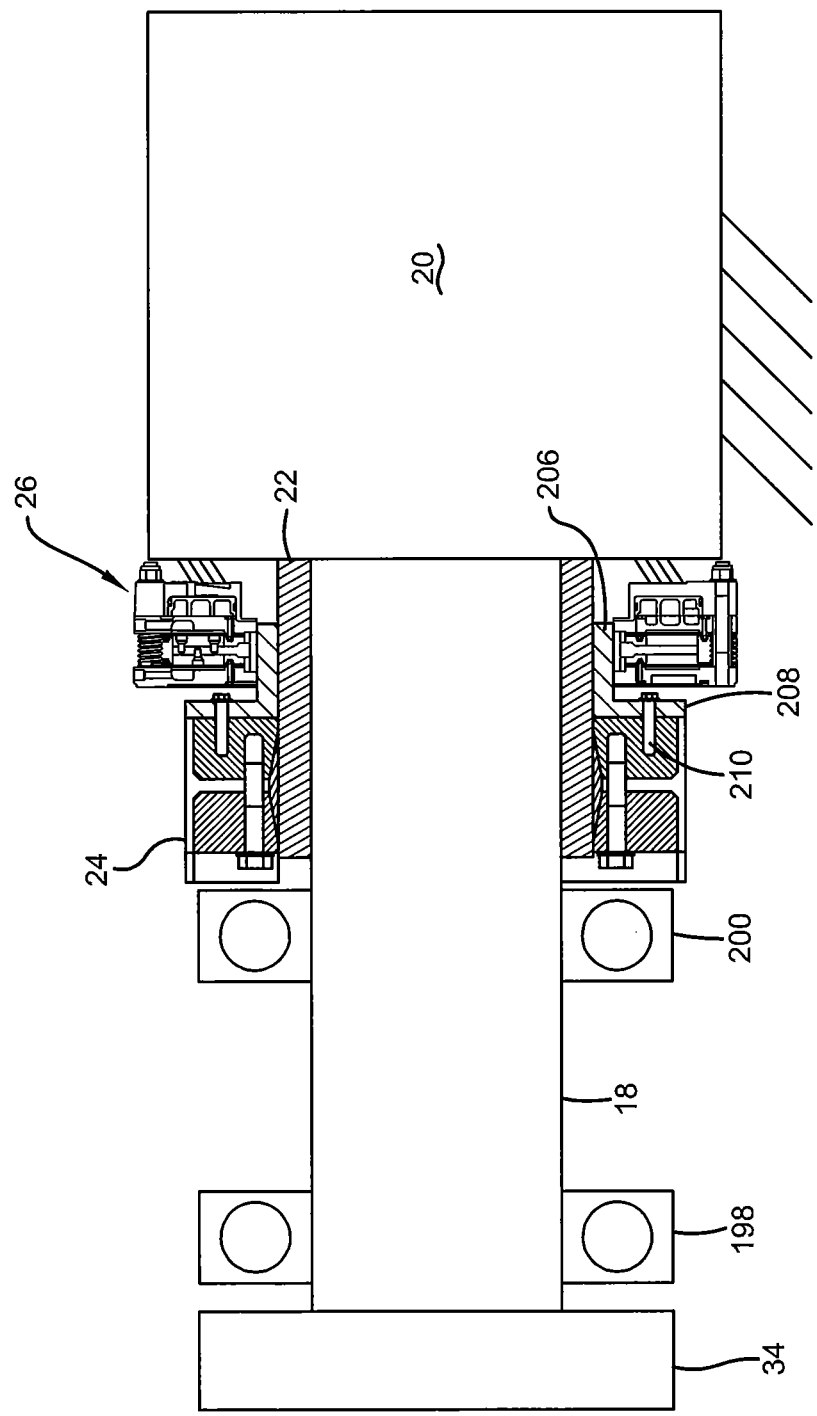
FIG. 7 is a schematic view of a second example of a mechanical arrangement of a wind turbine electric generator with a torque limiting brake.

FIG. 7 schematically shows an arrangement that is generally similar to FIG. 6. However, FIG. 7 shows an alternative arrangement for the operative connection of the torque limiting brake to the coupling and the low speed shaft. In this exemplary arrangement, a brake shaft 206 operatively engages the hub of the torque limiting brake 26. An outward radially extending flange 208 is operatively connected to the brake shaft 206. A plurality of mounting bolts 210 serve to operatively connect the flange and the shrink disc 24. The torque limiting brake 26 in this arrangement is mounted in fixed relation relative to the gear box, either by mounting the torque limiting brake directly or through intermediate structures thereto, or by anchoring the torque limiting brake to other structures located within the nacelle.

In this arrangement, the shrink disc 24 is used to connect the low speed gear box input shaft 22 and the low speed shaft 18 by the application of radially inward force thereto. The torque limiting brake operates to apply selectively variable drag force to the shrink disc 24, which serves as the coupling to the low speed gear box input shaft 22. As a result in this arrangement, the torque limiting brake 26 is usable to limit the applied torque on the gear box input shaft to below the threshold.

Figure 8:
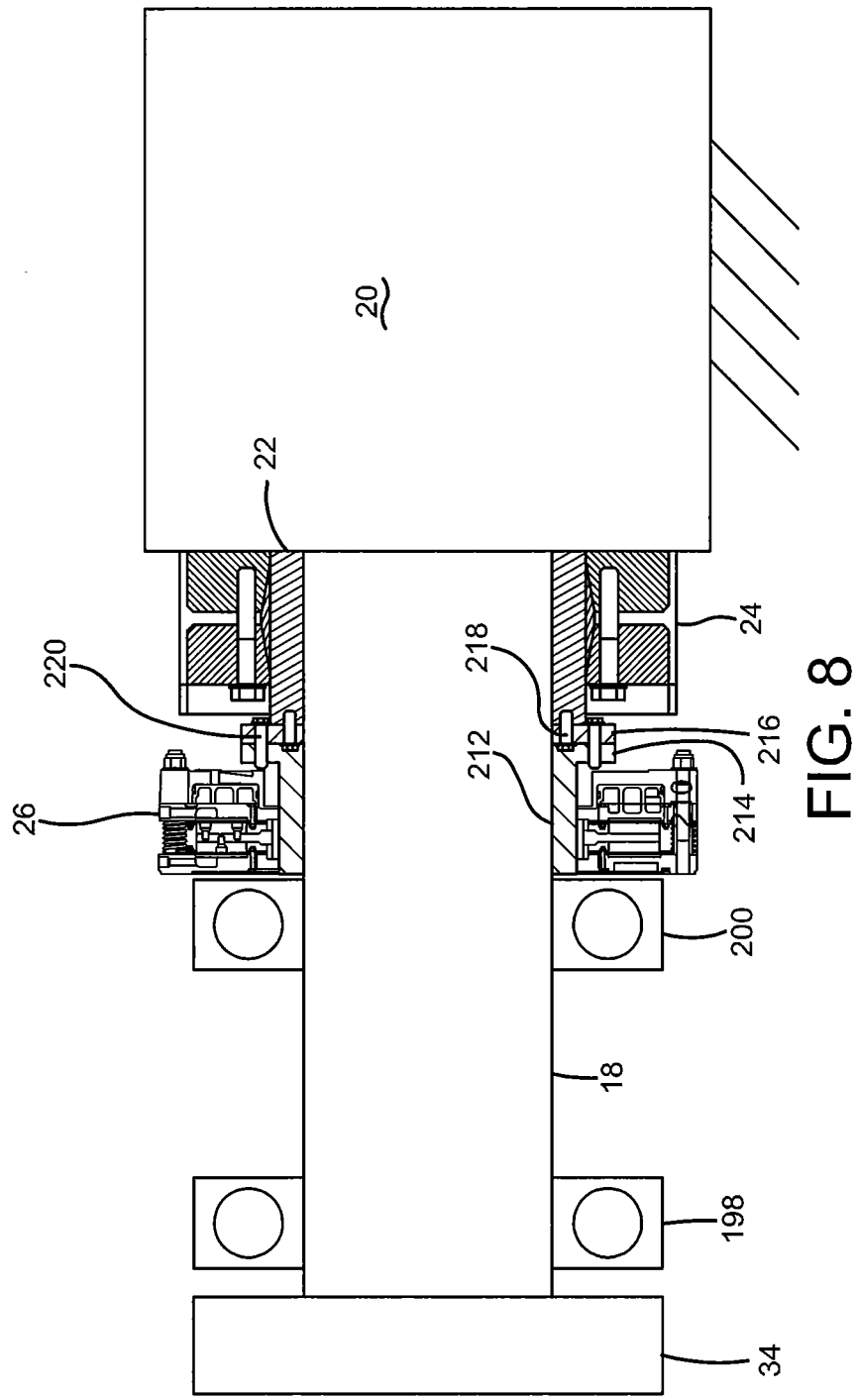
FIG. 8 is a schematic view of a third example of a mechanical arrangement of a wind turbine electric generator with a torque limiting brake.

FIG. 8 shows an alternative arrangement related to the mounting of the torque limiting brake 26 used to limit the torque that is applied to the low speed gear box input shaft 22 to below a threshold. In this exemplary arrangement, the torque limiting brake 26 is shown attached in fixed relation to the bearing support structure associated with bearing support 200. Of course it should be understood that this mounting arrangement is exemplary, and in other arrangements other mountings can be used.

In this exemplary arrangement, the brake shaft 212 that is engaged with the hub of the torque limiting brake is attached to a radially extending flange 214. In this arrangement, a further radially extending flange 216 is mounted in operative connection with the low speed gear box input shaft 22. Flange 216 is operatively connected to shaft 22 through mounting bolts 218. For example in this example arrangement, mounting bolts 218 may extend through openings in the flange surface 26 and threadably engage corresponding openings in the low speed gear box input shaft 22. Of course it should be understood that this approach is exemplary, and in other embodiments other approaches may be used.

In this example arrangement, flanges 214 and 216 are held in connected engagement through a plurality of flange bolts 220. Thus, in this example arrangement, the flange bolts serve to operatively connect the torque limiting brake 26 and the low speed gear box input shaft 22. In this arrangement, the shrink disc 24 which serves as a coupling is mounted to cause engagement of the low speed gear box input shaft 22 and the low speed shaft 18 by applying radial compressive force thereto. As a result, the torque limiting brake is also in operative connection with the coupling which serves to connect the low speed shaft 18 and the low speed gear box input shaft 22. As with the other arrangements, the arrangement of the torque limiting brake shown in FIG. 8 enables the torque limiting brake to control the torsional force that is effectively applied to the gear box input shaft 22.

Figure 9:
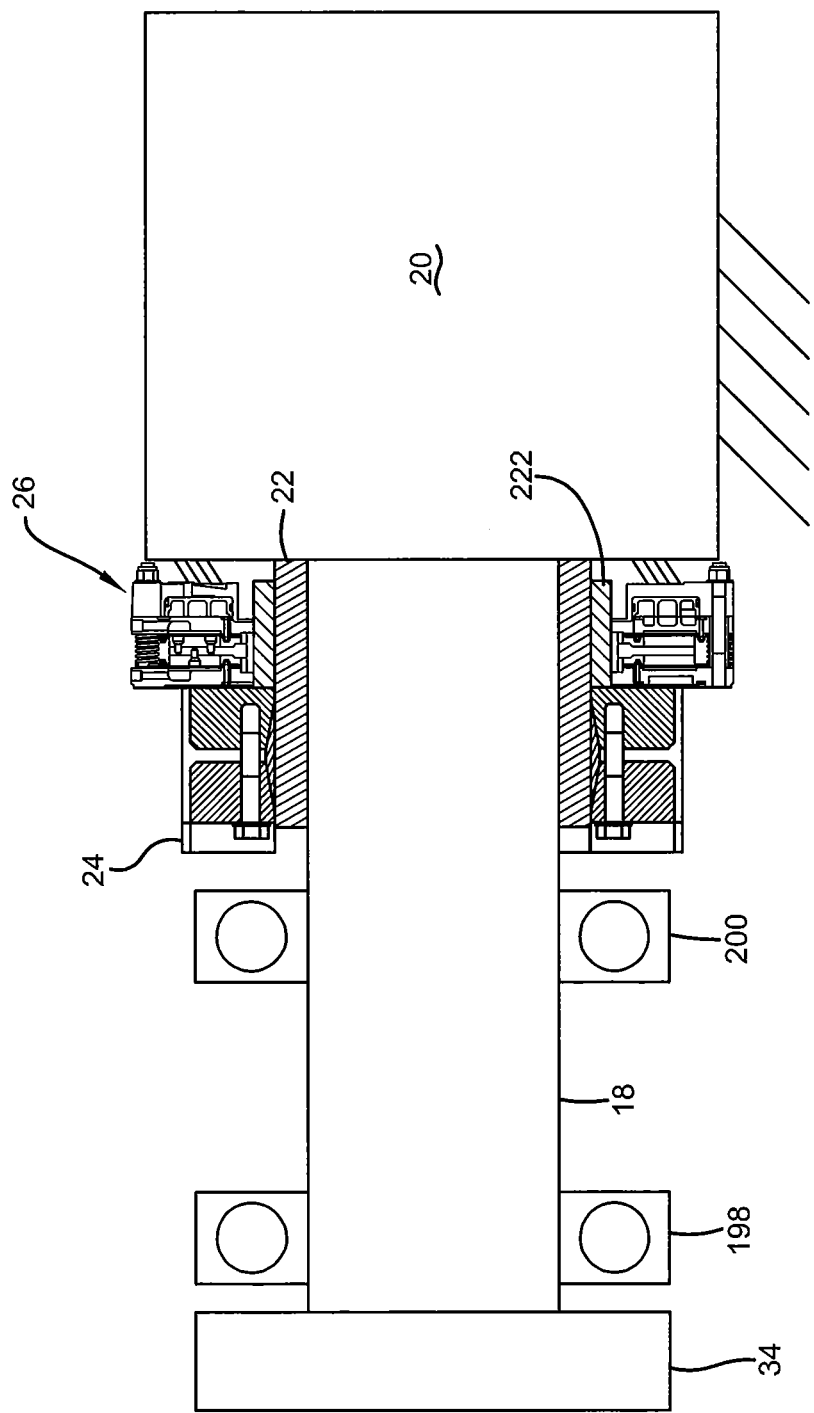
FIG. 9 is a schematic view of a fourth example of a mechanical arrangement of a wind turbine electric generator with a torque limiting brake.

FIG. 9 shows yet another alternative arrangement operatively connecting a torque limiting brake so as to limit the torque that is applied to the low speed gear box input shaft 22. In this exemplary arrangement, the low speed gear box input shaft 22 is connected to the low speed shaft 18 through radially directed force applied by the shrink disc coupling 24. In this example arrangement, a portion of the exterior surface of the low speed gear box input shaft 22 is provided with a splined or keyed contour which conforms to an inside surface of a brake shaft 222. Brake shaft 222 further includes an outer splined surface or other suitable contoured surface for engaging with the hub of the torque limiting brake 26. As with the other arrangements, the body of the torque limiting brake is anchored to structures which are operative to hold the torque limiting brake in generally relatively fixed position with respect to the gear box. Thus as with the other arrangements, the example arrangement shown in FIG. 9 enables the torque limiting brake to operate to effectively limit the torsional force that is applied to the low speed gear box input shaft 22 to below a threshold.

Figure 10:
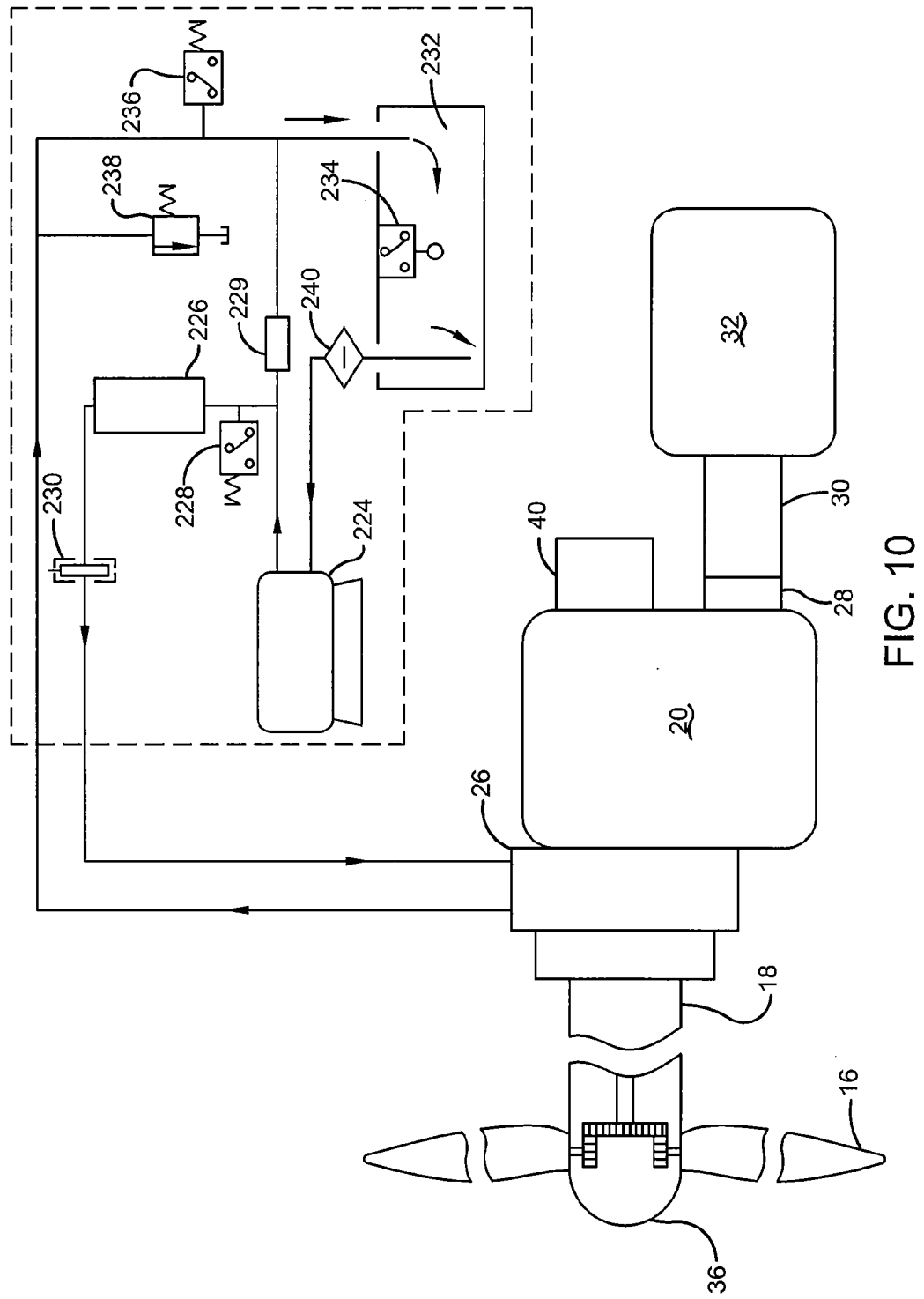
FIG. 10 is a schematic view of a wind turbine electric generator with a torque limiting brake and a cooling system that enables cooling the torque limiting brake to enable extended operation of the torque limiting brake in applying drag forces.

FIG. 10 schematically shows the cooling arrangement employed in connection with the exemplary torque limiting brake 26. As previously discussed, body portions of the torque limiting brake include coolant inlets and coolant outlets. A plurality of coolant flow passages through each of the body portions enables coolant liquid to flow through the body portions of the torque limiting brake so as to maintain the brake surfaces within acceptable temperature ranges. This enables the exemplary torque limiting brake to operate for extended periods while applying significant drag force to control the amount of force that is applied to the gear box 20.

As shown schematically in FIG. 10, the coolant system associated with the torque limiting brake includes a number of components. These components are located in the nacelle in the exemplary embodiment. However, in other arrangements other locations for such items may be utilized.

The exemplary cooling system includes a pump 224. In this example arrangement, pump 224 is configured to pump liquid coolant. This may be a water based coolant or other suitable coolant material that can be used for cooling the torque limiting brake. While a liquid coolant is utilized for cooling the brake in this example arrangement, in other arrangements other types of coolant materials may be used. These may include for example, using gaseous material as the coolant fluid to dissipate heat from the fluid passages in the brake. In still other arrangements, materials that undergo a phase change may be utilized to provide cooling capabilities. For example, materials that undergo a change in phase from liquid to gas in response to the absorption of heat in the fluid passages of the brake may be utilized in some arrangements for purposes of providing cooling. Of course as can be appreciated, in a phase change system the material may then go through an appropriate condenser or similar device to release the absorbed heat and return to a liquid phase before it is returned to the brake for cooling purposes. Further, in other arrangements water or other available fluids may be utilized for purposes of providing cooling fluid. Such cooling fluids may be utilized in open or closed loop systems, depending on the nature of the coolant material being used. Of course these approaches are exemplary of many different types of cooling arrangements that may be utilized.

In the exemplary arrangement, the outlet of the pump provides coolant liquid at elevated pressure, which flows into a liquid to air heat exchanger 226. Heat exchanger 226 may include a radiator, a coil, fin tubes or other suitable arrangement for releasing heat from the coolant to the adjacent ambient air which is ducted to flow through the heat exchanger. A pressure switch 228 is operatively connected to the line upstream of the heat exchanger. Pressure switch 228 is operative to sense the coolant pressure. Pressure switch 228 can be used to sense abnormal conditions, such as a loss of pump pressure or an over pressure condition that may result from a blockage in the line. As can be appreciated, pressure switch 228 is in operative connection with control circuitry that operates to take appropriate action in case a condition corresponding to a malfunction is detected.

In the example arrangement, the outlet of the pump is also in operative connection with valve 229. In some example arrangements, the valve 229 may comprise a pressure relief valve that may be configured to open when pump pressure exceeds a set pressure. When the relief valve opens, coolant is enabled to flow through the valve to a suitable outlet, such as into a coolant holding reservoir as shown. In other exemplary arrangements, valve 229 may comprise an electrically actuated valve. The valve may be opened and closed responsive to certain control circuitry that controls the opening and closing of the valve. For example, in some arrangements detection of pressure by the pressure switch 228 above a threshold may cause the opening of valve 229 so as to relieve the over-pressure condition. This may correspond for example, to a blockage in a line or heat exchanger, which prevents the appropriate amount of fluid flow.

In still other arrangements, valve 229 may be controlled through appropriate control circuitry to provide other functions. For example, in circumstances where cooling of the brake to the maximum extent that can be achieved through the full flow of the pump mechanism is not required because the brake is generating little or no heat, the flow from the pump can be diverted by opening the valve 229. This can reduce the amount of coolant liquid flow through the brake so that less cooling is provided. Such an approach may be particularly helpful where the amount of fluid that is pumped by the pump cannot be readily reduced. This might occur for example in situations where the pump is driven by a gear train that is directly connected to one or more of the shafts that are a part of the drive train within the wind turbine electric generator, and the speed of the pump cannot be readily changed. Such an approach may also be helpful in situations where gear pumps or other types of positive displacement pumps which cannot be operated in a dead head condition are utilized. Further in other exemplary arrangements, valve 229 may comprise a variable flow control valve. Thus for example, in such arrangements the extent to which fluid is output by the pump is directed to cool the brake and the amount that is diverted and dumped to a reservoir or similar container can be controlled. As can be appreciated, by varying the condition of valve 229, the amount of coolant flowing through the brake can be selectively varied as necessary to provide a desired amount of coolant flow. Of course it should be understood that these approached are exemplary, and various types of arrangements may be used to achieve these results.

In the example arrangement, the coolant leaving the heat exchanger passes adjacent to a temperature sensor 230. Temperature sensor 230 is operative to detect whether the heat exchanger was able to reduce the temperature of the coolant to a suitable temperature for cooling the torque limiting brake. Temperature sensor 230 is also in operative connection with the control circuitry so that appropriate steps may be taken in the event that a malfunction is detected. For example, if the heat exchanger is not able to cool the coolant material to a suitable low temperature, the control circuitry may take steps to cause the brake to fully release. In this example arrangement, by releasing the brake, the other control circuitry associated with the wind turbine electric generator, may operate as appropriate to control the speed and other conditions of the system as appropriate, without the action of the brake. Of course this approach is exemplary, and in other arrangements other steps may be taken in response to the cooling system not operating properly.

Coolant flows into one or more inlet ports of the torque limiting brake 26 and passes through the various fluid passages therein so as to absorb the heat produced by the frictional engagement of the friction pads and the rotating discs of the torque limiting brake. Fluid then passes out of the torque limiting brake through one or more coolant outlets. Coolant which exits the torque limiting brake flows to a coolant tank 232. Coolant tank 232 includes a level switch 234, which operates to monitor the level of the coolant in the tank. The level switch is in operative connection with the control circuitry and is usable to determine undesirable conditions such as a coolant overflow condition or a low coolant level condition within the tank.

In the exemplary arrangement, before the coolant is delivered into the coolant tank 232, the coolant passes a temperature switch 236. Temperature switch 236 is operative to determine the temperature of the coolant which has exited the torque limiting brake. In the exemplary arrangement, temperature switch 236 is in operative connection with the control circuitry. The control circuitry may operate in accordance with its programming to change flow conditions in response to the temperature of the coolant as sensed by the temperature switch. For example in some arrangements, if the temperature is sensed as increasing toward an undesirable level, the control circuitry may operate in accordance with its programming to increase the flow output by the pump or to reduce flow being bypassed through valve 229 so as to provide additional cooling to the torque limiting brake. Likewise, if the temperature of the coolant leaving the torque limiting brake is relatively low, the flow through the torque limiting brake may be reduced. This may be done, for example, by reducing flow from the pump or by bypassing more coolant flow through valve 299. Various approaches may be taken, depending on the configuration of the particular system.

The exemplary coolant system further includes a pressure relief valve 238. Pressure relief valve 238 may operate to avoid the occurrence of undesirably high pressures within the system so as to avoid damage thereto. For example, the pressure relief valve may operate to relieve fluid pressure in the event that a component in the system is clogged and the pressure rises unduly high.

In the exemplary arrangement, the coolant tank 232 is used to hold and supply the liquid coolant, which is delivered to the inlet of the pump 224. In exemplary arrangements, the pump inlet line may be fitted with a strainer, filter or other suitable device generally indicated 240 that operates to prevent particles and other undesirable contaminates from entering the inlet of the pump. In exemplary arrangements, the coolant pump may be operated by an electric motor. In other arrangements the pump may be operated by a hydraulic or pneumatic motor, or alternatively may be driven from one or more shafts or similar moving members that move in connection with the wind turbine generator. Further it should be understood that the cooling system is shown as exemplary, and in other arrangements other or different components and devices may be utilized.

Figure 11:
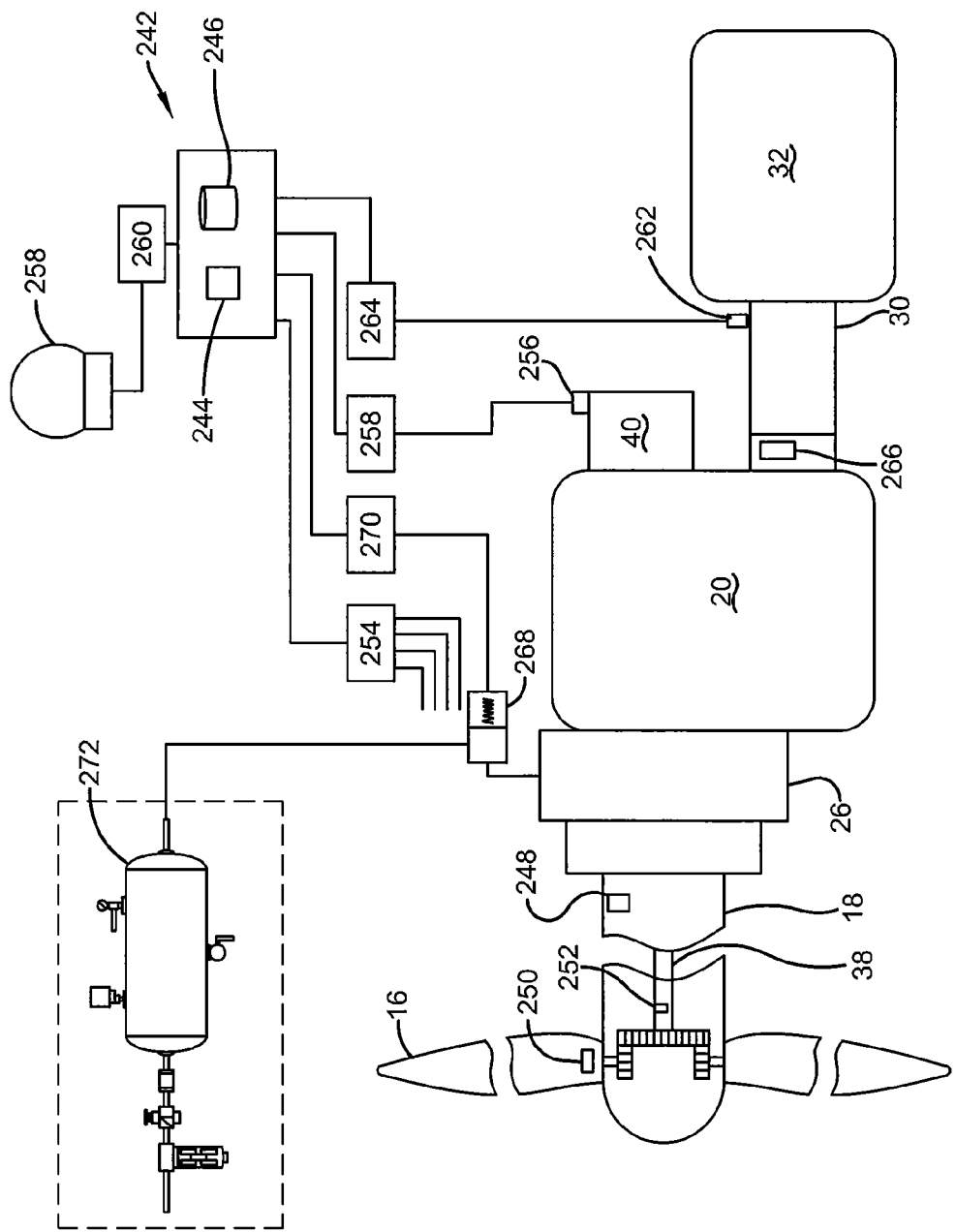
FIG. 11 is a schematic view of a wind turbine electric generator with a torque limiting brake and associated braking control circuit that controls the variable drag force applied through operation of the torque limiting brake.

FIG. 11 shows schematically an exemplary arrangement of the control circuitry associated with the control of the torque limiting brake 26 in connection with limiting the torque applied to the low speed gear box input shaft 22 to below a threshold. In the exemplary arrangement, brake control circuit schematically indicated 242 is used for purposes of controlling the drag force that is applied by the torque limiting brake. The exemplary brake control circuit 242 includes at least one processor such as a microprocessor schematically indicated 244. The one or more processors 244 is in operative connection with one or more data stores 246. The one or more data stores 246 hold computer executable instructions and other data that is utilized in the operation of the at least one processor 244 in controlling operation of the torque limiting brake. It should be understood that while the control circuit 242 for the torque limiting brake is shown as a separate circuit, it may be integrated in some arrangements with other control circuitry of the wind turbine electric generator. Further it should be understood that in some exemplary arrangements the data stores may include one or more different types of computer readable media suitable for holding and having computer executable instructions read therefrom. For example, in some arrangements such computer readable media may include a hard disc drive, flash memory, firmware memory, optical memory, magnetic memory, or other suitable types of media. The particular type of media used will depend on the particular system in which the control circuitry is operated. Further it should be understood that while an electronic control circuit is shown in the exemplary arrangements, in other arrangements other types of control circuitry may be utilized. These may include for example pneumatic or hydraulic control logic, which operates to provide varying control outputs that can be utilized for purposes of controlling fluid pressures, or other outputs that can be used for controlling one or more brakes in a manner like that discussed herein as achieved through the use of electric control circuitry.

In the example arrangement, the brake control circuit 242 is in operative connection with one or more sensors. Exemplary sensors are operative to sense at least one property. At least one property sensed may correspond to the current torsional force as is currently available to be applied to the low speed gear box input shaft 22 from the force produced by rotation of the wind turbine blades 16. In other arrangements, the at least one sensor may sense a property associated with a future torsional force that will be produced by the at least one wind turbine blade responsive to conditions that will soon be occurring in the area of the wind turbine electric generator.

In some exemplary arrangements, the torsional force currently available from the wind and turbine blades available that could be applied to drive the low speed input shaft 22 of the gear box 20 is determined based on measurements by one or more strain sensors. Such strain sensors may include for example strain sensors 248 on the low speed shaft 18. Strain sensors may also sense the level of strain in areas of the blades 16. Such strain sensors may be installed in one or more areas on the blades as represented by strain sensor 250. Other strain sensors, such as strain sensor 252 may be attached in operative connection with the pitch control shaft 38 or other member in the pitch control system. Of course these strain sensors are exemplary, and in other arrangements other types of strain sensors may be used. In the exemplary arrangement, each of the strain sensors is in operative connection with the brake control circuit 242 through one or more appropriate interfaces 254.

In the exemplary arrangement, one or more sensors may also be in operative connection with at least one component of a hydraulic control system used for controlling the blade pitch. For example, in embodiments where the pitch control system includes the hydraulic actuator, a sensor 256 may operate to sense hydraulic pressure that is generated in the system by the torsional loading of the wind force acting against the blades. As can be appreciated, the greater the wind force that is resisted to hold the blade position, the greater the hydraulic pressure force that can be sensed. In such arrangements, at least one pressure type sensor in operative connection with the hydraulic actuator which is used to control pitch, is a sensor that provides signals which are indicative of the torque that is currently available and might be applied to the low speed gear box input shaft 22. In other arrangements, the sensor 256 may be operative to sense a change in position of the hydraulic actuator that is used in connection with controlling the pitch of one or multiple blades. As can be appreciated, the magnitude of wind force that may be applied will result in at least some displacement of the hydraulic actuator used to change blade pitch or one or more mechanical members that are used to interconnect the hydraulic actuator in the blades. Such displacement may be detected by the sensor and may represent an indication of wind force which corresponds to available torque for driving the low speed shaft 18. The sensor 256 communicates signals through a suitable interface 258 to the brake control circuit 242. Of course it should be understood that although only one sensor is shown, other arrangements may include multiple sensors.

In still other arrangements, the pitch control system may operate in response to an electrical actuator. In cases where the electrical actuator is operating to move the pitch of the blades, the force associated with movement of the blades that provides rotational blade movement will be resisted or assisted by wind force. As a result, by including a sensor that measures the required amperage of the electrical actuator used to change blade pitch, a sensed parameter that corresponds to available torque may be obtained. A suitable interface for the signals indicating the level of amperage draw may be used to provide the data to the brake control circuit 242 for purposes of determining the available torque that might be applied to the gear box. Alternatively or in addition, as in the case with hydraulic actuators, an electric actuator or connected members thereto may sustain movement or change in displacement responsive to the force acting on one or more turbine blades. This change in displacement may be detected by one or more appropriate sensors to obtain an indication of wind force acting on the blades 16, and thus data representative of torsional force driving the low speed shaft 18. Thus in such arrangements where electrical actuators are used, movement of the blade by the electrical actuators is not required in order to obtain data which provides an indication of wind produced driving force. Of course these approaches are exemplary, and in other arrangements other approached may be used.

In still other arrangements, other sensors may be utilized for purposes of obtaining data which corresponds to available torsional driving force. For example, in some arrangements one or more sensors may be attached to the nacelle, the wind turbine support structure, or other structures to obtain information which corresponds to available low speed shaft driving force. For example, wind force may cause pressure and/or strain forces on one or more walls of the enclosure which comprises the nacelle. The pressure and/or strain forces acting on the enclosure walls or other structures can be measured via a strain sensor, pressure sensor or other types of sensors and corresponding signals provided to the brake control circuitry through suitable interfaces. The strain forces may be used to provide an indication of the wind force acting on the nacelle wall, and thus may correspond to the wind force driving the turbine blades 16 and the low speed shaft 18. Similarly, sensors on the support structure for the wind turbine electric generator, such as on the structures of the pedestal or other structures that undergo change in properties that can be sensed in response to wind driving forces may have suitable sensors applied thereto. Signals from such sensors may also be utilized to obtain an indication of current wind force acting on such structures and the corresponding value of available torque that may act on the low speed shaft 18.

In still other arrangements, at least one sensor may be positioned to sense other properties that correspond to the available torque. For example, in exemplary arrangements the wind force acting on the blades 16 provides a corresponding force that acts in an axial direction on the low speed shaft 18. This force provides a compressive force on the low speed shaft 18 which can be detected by strain sensors or other suitable sensors. Similarly, this wind produced axial force may also be detected through sensors in other areas. This may include for example sensors attached to bearing supports which are operatively engaged with the low speed shaft 18 and which are subject to force along the axial direction due to the force of the wind acting on the turbine blades. Suitable sensors on the bearing supports may be utilized to sense the properties of strain and/or displacement caused by such forces which sensed properties may be utilized for purposes of calculating available torque. In still other arrangements, the force applied by the wind on the turbine blades may be detected through sensors associated with mounting structures which are used to hold components that are subject to the force to other stationary structures within the wind turbine electric generator apparatus. For example, the mounting structures associated with the gear box 20 may have associated strain and/or displacement sensors which can sense the effects of the axial wind force acting on the low speed shaft as transmitted to the gear box or other connected structures. By measuring at least one property that corresponds to the wind force axially applied to the low speed shaft, the brake control circuit 242 may operate in accordance with its programming to determine the available torque driving the low speed shaft.

In still other exemplary arrangements, the at least one property sensed by the at least one sensor may include the velocity of wind that has not yet encountered the wind turbine blades. The velocity of wind that is moving toward the wind turbine may be determined using at least one sensor 258 (e.g., FIG. 11). Sensor 258 may in some arrangements include Doppler radar sensors that are suitable for determining velocity of wind that will be encountered by the wind turbine within a relative short period, such as for example in the next five minutes. Of course, different periods of time may be utilized, depending on the particular Doppler radar sensor and/or the requirements of the wind turbine electric generator 10 (or wind turbine system). Further in other arrangements, a wind sensor may include a laser based Lidar system which is operative to sense wind velocities and properties that the wind turbine blades will soon be encountering.

In exemplary arrangements that include Doppler radar or Lidar systems, such systems may sense not only properties of wind velocity, but also properties of matter that may be carried by the wind and may provide loading and apply force to the turbine blades and the gear box. This may include for example, hail, water, snow or other forms of precipitation that are moved responsive to wind force and which may impact against the turbine blades. Such impacts may increase the torque loading on the gear box. Further, plural radar or Lidar systems may be utilized in connection with coordinated processor systems so as to obtain data regarding not only wind velocity of winds traveling toward the particular wind turbine electric generator, but also other wind factors including directional information that can enable adjustment of the wind turbine operating parameters so as to avoid damage and maintain operational capabilities. In some arrangements, such computer computational capability may be included in the control circuitry of the wind turbine generator. In other arrangements, a local or remote computer system may be used to make such calculations and send data to the brake control circuit 242 or other control circuitry that is used in controlling the wind turbine electric generator.

It should be understood that in addition to radar and Lidar systems, other types of systems may be used in connection with brake control circuitry. Such systems may include anemometers, wind directional measurement systems and other sensors which provide information about at least one property that is usable by the brake control circuit 242 to facilitate operation of the system. Each of such sensors may be operatively connected to the brake control circuit 242 through an appropriate interface, such as interface 260.

In an exemplary arrangement, one or more rotational speed sensors 262 is utilized (e.g., FIG. 11). The rotational speed sensors are utilized to monitor the rotational speed of at least one component whose rotational speed corresponds to the speed of at least one of the high speed gear box output shaft 28 or the low speed gear box input shaft 22. In the exemplary arrangement, the speed sensor 262 is operative to monitor rotational speed of the high speed shaft 30. Data from the speed sensor 262 is transmitted to the control circuitry through an appropriate interface 264.

Further, in exemplary arrangements the loading applied by the generator 232 on the high speed shaft 30 may also be monitored through operation of the brake control circuit 242 for purposes of achieving control and avoiding possible damage during the variable operating conditions that may be encountered. The current mechanical resistance load applied by the electrical generator may be determined responsive to parameters measured by various sensors and/or outputs produced by the electrical generator. Alternatively, loading may be detected by one or more sensors such as a strain sensor 266, which is in operative connection with the high speed gear box output shaft 28. Of course numerous different types of sensors and interfaces may be used for determining properties that may be useful in connection with control of the torque limiting brake.

The example brake control circuit 242 is in operative connection with at least one variable pressure fluid control valve 268. The condition of control valve 268 is controlled by the control circuit through an interface 270. The control valve 268 may be operative to provide varying levels of brake fluid pressure to the torque limiting brake 26. The brake fluid pressure in the exemplary arrangement is pneumatic pressure that is supplied from a compressor (not shown) and which is stored at elevated pressure in an air receiver tank 272. Air receiver tank 272 holds a sufficient volume of air to enable the variable pressure fluid control valve to repeatedly act to apply and relieve pressure at suitably high levels as necessary to apply drag force during operation of the torque limiting brake. Of course it should be understood that while in the exemplary embodiment brake fluid pressure is applied in the form of pneumatic pressure, in other arrangements other types of fluid pressure, such as hydraulic pressure, may be utilized for purposes of causing the drag force that is generated by the torque limiting brake.

In operation of the exemplary arrangement, the brake control circuit 242 utilizes the sensors to sense at least one property that corresponds to at least one of the current torsional force and/or a potential future torsional force that can be produced by the blades 16, and which force can be available at the low speed gear box input shaft 22. In exemplary arrangements, strain sensors are operative to sense strain properties which correspond to then current torsional force in the low speed shaft 18, the wind turbine blades 16, or other structures/components. A rapid rise in (upstream) strain corresponds to a rapid rise in torsional force that may (later) be applied to the low speed gear box input shaft 22 if preventive steps are not taken to resist the force and prevent it from acting on the gear box 20. For example, the exemplary control circuit 242, with its one or more processors, can operate in accordance with its programming to determine that signals from the strain sensors correspond to a rapid spike in torsional force. In response to the sensor-based processor-determination, the brake control circuit 242 can automatically operate to cause actuation of the variable pressure control valve 268 to apply a determined amount of brake fluid pressure force. This preventive (early) actuation generates a drag force on the gear box input shaft 22 so that torsional force above a programmed (predetermined) threshold does not get applied to the gear box input shaft. Thus, the sensing of an upstream event (e.g., strain involving a wind turbine component) can be used to promptly prevent a downstream event (e.g., a threshold-exceeding torsional force acting on the gear box input shaft) from occurring.

Further, in the exemplary arrangement, the strain sensors and/or other sensors are operative to detect a continuing application of torsional force, such as the result of continuing repetitive wind gusts or high wind speed. In such arrangements, the brake control circuit 242 is operative to actuate and vary drag force produced by the torque limiting brake so that the torque applied to the input shaft of the gear box is always maintained below the threshold.

In the exemplary arrangement, the brake control circuit 242 is operative to control the brake in response to the available torque that is currently available or in the near future will be available to turn the low speed shaft 18 (and the connected low speed gear box input shaft 22) in the operative direction for generating electricity. In this arrangement, in circumstances where the wind velocity acting to turn the turbine blades falls from a prior level, the low speed shaft 18 and the blades 16 will continue rotating as a result of inertial forces rather than the applied force from the wind flow. In these circumstances where rotation of the blades and the low speed shaft continues based on the inertial forces, the at least one sensed property corresponding to available torque from the wind force will be detected as a lesser value than when the wind force was greater. As a result, the exemplary brake control circuitry in these circumstances may operate to release the brake either wholly or partially, so that the low speed shaft may continue rotating in response to the inertial forces. This enables the wind turbine electric generator to obtain the full benefit of the prior wind energy that produced the inertial forces, and to sustain the desired rotation of the wind turbine electric generator components at a desired speed so as to continue the production of electricity. As can be appreciated, this approach may provide for more efficient operation and the wind turbine electric generator being able to take advantage of the inertial properties of its moving components, while at the same time preventing the application of excessive loading to the low speed gear box input shaft 22 and other drive train components.

Further, in the exemplary arrangement, the one or more speed sensors 262 are operative to monitor the rotational speed which corresponds to the rotational speed of the low speed gear box input shaft 22 and/or the high speed gear box output shaft 28. The exemplary brake control circuit 242 is operative to also control the level of brake fluid pressure applied to the torque limiting brake so as to maintain the rotational speed for the high and low speed shafts within acceptable parameters and below at least one programmed threshold.

Further, in other example arrangements, sensors such as Doppler radar and/or Lidar sensors can determine wind profiles that the wind turbine electric generator will be encountering in a near term future period. Responsive to a processor determination of the wind velocity and/or other characteristics that the wind turbine generator will soon encounter, a braking control circuit processor 244 in an example embodiment operates in accordance with its programming to adjust the drag force of the torque limiting brake so as to adjust the drag suitably in advance so that when these wind forces are actually encountered, they do not impart undesirable torsional spikes or cause other undesirable conditions to the gear box or other wind turbine components. Further, the advance (preventive) action and control of the torque limiting brake can help to maintain the operational speed of the wind turbine generator within desired limits so it is not adversely affected by irregular wind or other weather (meteorological) conditions encountered.

As previously discussed, at least one processor associated with the brake control circuit 242 is able to predict that a distant (remote) wind event is approaching the wind turbine system which will cause the torsional force acting on the gear box input shaft 22 to be exceeded. The at least one processor may be located either on site of or remote from the wind turbine system. Further, the at least one processor is also able to determine a time length (e.g., 3-10 minutes) remaining until this approaching wind event will (arrive and) affect the torsional force acting on the gear box input shaft 22. The time length/period can be determined based on several factors, including a sensed wind speed, a sensed wind direction, and the distance of the wind sensors from the wind turbine system 10. Thus, the brake control system can optimize generator efficiency of the wind turbine by not causing too soon (early) braking. That is, by being able to determine how much time remains until braking must be applied, the brake control system can efficiently wait for the ideal time to apply the brake. The ability of the control system allows for a future start braking time to be determined, in contrast to an immediate (automatic) braking upon wind event sensing.

It should be understood that in other exemplary embodiments an immediate (automatic) braking may be carried out when the wind event is first sensed or determined. For example, the at least one processor associated with the brake control system can be configured to receive wind speeds detected by wind sensors that are strategically located at various known distances from the wind turbine system 10. As a result, detection of a particular wind speed at one or more of these sensors, because of its known proximity to the wind turbine system 10, can cause an automatic tripping of the braking action. That is, a sensed wind speed at a known distance can be used by the brake control system to trigger an automatic braking of the gear box input shaft 22.

Again, the at least one processor can predict/determine that a current condition exists which will cause the torsional force threshold to be exceeded (after a processor-determined time period expires), unless preventive braking is timely applied to the low speed gear box input shaft (before the determined time period expires). The processor can predict a time range in which the application of preventive braking action will be to late to prevent the threshold from being exceeded. Thus, the processor can also determine a safe amount of time remaining (if any) until the preventive braking needs to be started. The processor programming includes a time determining safety factor. The safety factor adds additional time to prevent a threshold breach.

The processor prediction of a threshold exceeding condition can be based on one or more conditions sensed by sensors which are spaced from the low speed gear box input shaft. The sensors can provide local sensing and/or remote sensing. That is, the processor prediction can involve sensors which do not sense a current condition or property (e.g., rotational speed, force, etc.) of the low speed gear box input shaft itself. Rather, the (non gear box input shaft) sensors can be arranged to sense: (1) one or more (local) current condition/property of at least one different component (e.g., turbine blades) that is located at the wind turbine system; and/or (2) one or more (remote) current condition/property (e.g., wind speed of approaching weather) that is remotely located from the wind turbine system.

A sensed local current condition (e.g., current movement of a wind turbine blade) can indicate (or correspond to) a force created (or is being created) that is going (or available) to be applied to the low speed gear box input shaft. The (stored, upstream) force is available in the wind turbine system 10 but it has not yet been applied to (or reached) the gear box input shaft. For example, a sensed force acting on a turbine blade 16 has not yet been imparted to the slow speed shaft 18, and thus has not yet been imparted from the slow speed shaft to the low speed gear box input shaft 22. Thus, there can be a time delay before a sensed condition (e.g., a physical force acting on a turbine blade) results in the gear box input shaft being physically affected. During this time delay the preventive application of drag force and braking can be initiated.

A sensed remote current condition (e.g., wind speed of approaching weather) can also indicate (or correspond to) a force that is going (or available) to be applied to the low speed gear box input shaft. The (upstream, future) force is not yet available in the wind turbine system 10. Thus, the force associated with the sensed condition is also not available to be applied to the low speed gear box input shaft. However, a future torsional force which will eventually act on gear box input shaft can be predicted from the sensed remote condition. For example, a sensed approaching wind speed has not yet produced a force that acts on the turbine blade 16, thus the future force has not yet been imparted to the slow speed shaft 18, and thus the future force has also not yet been imparted from the slow speed shaft to the low speed gear box input shaft 22. Thus, there is a time delay before the sensed remote condition (e.g., a distant wind speed) results in the gear box input shaft being physically affected. During this time delay the preventive braking can be initiated.

A future force that is predicted (based on a sensing of at least one remote condition) to later act on the wind turbine blade can be associated with a first time delay. A current force (based on a sensing of at least one local condition) that is already acting on the wind turbine blade can be associated with a second time delay. Each time delay can correspond to an amount of time before the gear box input shaft is physically affected. As can be seen, the first time delay (which may have minutes) may be longer than the second time delay (which may be seconds or a portion of a second).

In an exemplary embodiment the brake is processor-controllable to maintain the torsional force below a predetermined threshold by providing pre-threshold preventive braking to the low speed gear box input shaft, responsive at least in part to at least one sensor-based processor-prediction that the predetermined threshold will be exceeded without the preventive braking. Furthermore, in exemplary embodiments the at least one processor associated with the brake control system is able to determine in real time whether preventive braking should be applied.

The exemplary brake control system can be part of an original wind turbine system. Alternatively, it should be understood that an existing wind turbine system can be retrofitted to include the addition of the exemplary brake control system. The exemplary braking arrangement comprises a configuration which allows for its attachment/installation as an aftermarket upgrade for existing wind turbines, without requiring turbine plant design changes. As can be appreciated, an exemplary braking arrangement can also be used with different gearbox, drivetrain, and/or shaft connections configurations.

As can be appreciated, different methods of installing the exemplary brake control system can correspondingly result in the arrangements shown in FIGS. 6-9. An installation method may include the handling (or adjustment, modification) of a shrink disk, torque limiting brake, and brake shaft. For example, in some installation processes an already existing low speed gear box input shaft and the slow speed shaft may not need to be handled/adjusted. However, other installation methods (including original turbine plant installation) may require handling a low speed gear box input shaft and/or a slow speed shaft.

Further, in exemplary arrangements, the brake control circuit 242 may be in operative connection with other sensors that detect conditions that may indicate a need to change the operating properties of the wind turbine electric generator. For example in some arrangements, the brake control circuit may include a radio receiver (sensor) that is operative to receive (sense) signals from transmitters that are attached to protected or endangered bird species, such as California condors or other birds, that may be injured by impact with rotating turbine blades. In response to sensing such transmitters on endangered species moving toward or in the area (vicinity) of the turbine generator, the control circuitry can operate in accordance with its programming to rapidly apply drag force so as to slow the rotation of the turbine blades and thus reduce the risk of harm to such birds, which may be migrating through the area of the turbine generator. In other bird detection arrangements, radar or Lidar may be used which is specifically configured for certain sizes/shapes of particular birds, such as a bald eagle. Again, preventive braking can be applied (such as to the low speed gear box input shaft) to protect a detected endangered bird.

In still other bird detection arrangements, bird sounds/calls (in the vicinity or area of the wind turbine) can be gathered by at least one audio detector and analyzed by at least one circuit including a processor to determine if the sensed sound corresponds to a bird for which the turbine blades are to be slowed. Different types of electronic audio (or acoustic) filters can be used to enhance detection of a particular known sound (e.g., a discrete shrill) associated with a particular species of bird. Such audio filter technology can be used to suppress all (unwanted) sound frequencies except those (wanted) frequencies between given high and low limits; reduce noise and interference; enhance the signal-to-noise ratio; and improve tracking performance. Again, at least one circuit including at least one processor (e.g., a microprocessor), associated with the wind turbine system is able to determine in real time, based on acoustic detection and filtration techniques, whether preventive braking should be applied to enhance bird safety. It should be understood that these approaches are exemplary, and in other embodiments other arrangements may be used.

In still other exemplary arrangements, the brake control circuit 242 may be in operative connection with sensors that detect other properties, such as acoustic properties that correspond to the noise level that is produced by the blades. The noise level produced by the rotation of the blades in many wind turbine arrangements corresponds to the rotational speed of the blades. Alternatively, or in addition, noise variation in accordance with one or more sound profiles (or patterns) that can be detected and identified may correspond to blade speeds. By sensing the noise level, and/or the sound variation profile(s), the brake control circuit may operate in accordance with its programming to determine that the wind turbine electric generator is in an over-speed condition. In response to such determination, the exemplary brake control circuit may operate in accordance with its programming to provide additional drag force so as to reduce the rotational speed of the blades to within acceptable levels.

In still other arrangements, sensors which detect acoustic properties, including for example noise levels produced by the blades, may be utilized for purposes of avoiding undesirable conditions that may occur in certain circumstances. For example, in the case where the wind turbine electric generator is operated near a population center, it may be desired to maintain lower levels of blade-produced noise during night time hours when most of the population is asleep. In some exemplary arrangements, the brake control circuit 242 can operate in accordance with its programming to make time determination decisions to reduce wind turbine speed or otherwise change pitch or other wind turbine parameters in response to the time of day or other time dependent parameters. Thus for example, by monitoring wind noise and/or sound profiles (patterns), the brake control circuit may operate to cause the blade speed to be reduced and thus noise to be reduced, during night time hours so that complaints from the population about being unable to sleep due to noise generated by wind turbines are reduced. Of course these approaches are exemplary, and in other arrangement controlling produced noise on the basis of other parameters may be utilized.

Again, different types of audio sensors and filters can be used by a processor to determine unacceptable sounds, unacceptable sound (volume) levels, unacceptable changes in sound, and/or unacceptable sound patterns. For example, some particular sound patterns may be determined by the processor to be equated with an unacceptable vibration condition. Absent any indication of unusual vibration being detected by a vibration (contact) sensor, the processor may act to cause further review to be undertaken to detect the source of the sound-detected vibration.

In still other arrangements, one or more sensors may be utilized for detecting other properties that may be indicative of other conditions which may provide an indiction of one or more statuses of components of the wind turbine electric generator. For example, in some arrangements sensors which are operative to detect vibration may be utilized in connection with one or multiple components in the system. The detection of vibrations may be indicative of malfunctions or other conditions which may suggest a problem or a developing problem with the wind turbine electric generator. Thus, for example in some exemplary arrangements, the detection of vibration above a certain magnitude level and/or at certain frequencies that correspond to a current or developing malfunction cause the control circuitry to operate in accordance with its programmed instructions to change the condition of the torque limiting brake or other components of the system. For example, the control circuitry may operate in accordance with its programming to detect an unacceptable level of vibration in or adjacent to the blade structures. In an example arrangement, this causes the control circuit 242 to apply the brake to slow the rotational speed of the low speed shaft 18 and the blades 16. The exemplary control circuit may then operate to determine if by slowing the speed, the vibration is reduced or eliminated. If the excessive vibration is eliminated as a result of slowing the speed, the control circuitry may operate in accordance with its programming to continue to maintain the drag force applied through the torque limiting brake or may change the pitch of the blades, or may cause through other connected components to maintain the slow speed so as to avoid damage to the blades or to other components as a result of excessive vibration.

Alternatively or in addition, in other arrangements the control circuitry may operate in accordance with its programming to determine if allowing an increase in speed reduces vibration or eliminates vibrations in ranges that are considered harmful for purposes of operation of the wind turbine electric generator. Thus for example, if it is determined that an increase in speed eliminates the harmful vibration, the control circuit may operate in accordance with its programming to allow the rotation to occur at a higher speed so as to avoid potentially adverse effects. This may be accomplished by reducing drag force applied by the brake.

Of course it should be appreciated that the ability to vary the rotational speed of the wind turbine electric generator can be accomplished not only by varying the drag force applied by the torque limiting brake or other brake structures within the system, but it may also be achieved by changing the operational characteristics of other devices. This may include for example, changing blade pitch, changing the load applied by the electric generator, changing the particular shaft utilized for generating electricity in situations where the arrangement includes one or more mid speed shafts as well as a high speed shaft, and/or changing other suitable parameters of operation to achieve a speed change. Numerous different approaches may be utilized in various arrangements to achieve desirable results, depending on the particular systems involved.

Figure 12:
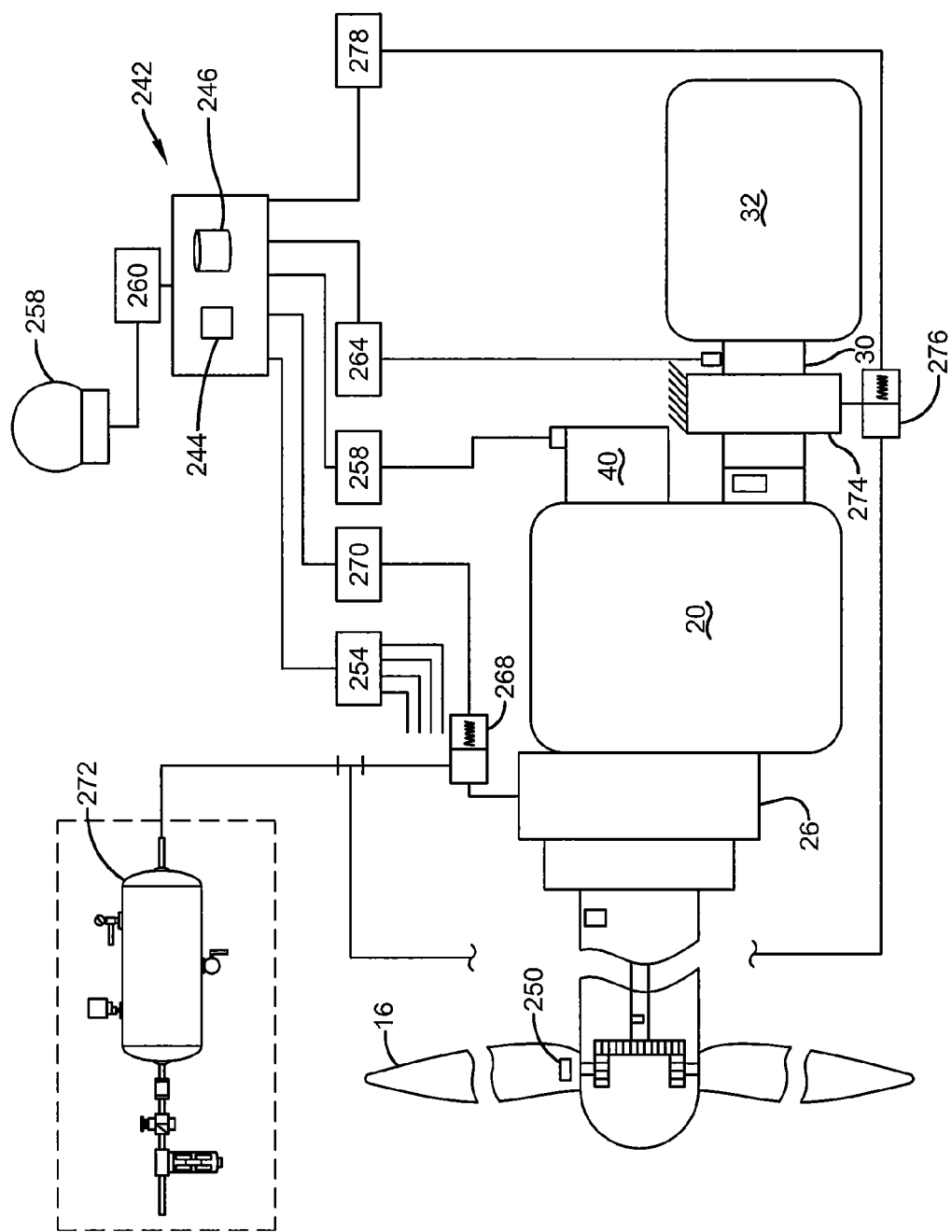
FIG. 12 is a schematic view similar to FIG. 11 of a wind turbine electric generator with multiple torque limiting brakes.

FIG. 12 shows an alternative arrangement of the wind turbine electrical generator control system. This alternative arrangement is generally similar to the arrangement shown in FIG. 11, except as otherwise specified. In this arrangement the system includes a further torque limiting brake 274. The further torque limiting brake is in operative connection with the high speed shaft 30. In exemplary arrangements, the further torque limiting brake 274 may be one of the types previously described, or another type of torque limiting brake that can selectively apply variable drag force to resist rotation of the shaft or other components to which it is operatively connected.

At least one further variable pressure fluid control valve 276 is in operative connection with the source of pneumatic pressure provided by the air receiver tank 272. Control valve 276 is also in operative connection with the brake control circuit 242 through an interface 278. As with the case of torque limiting brake 26, the further brake 274 may include one or more fluid pressure ports to which brake fluid pressure is applied to cause variable drag force to be imparted to the high speed shaft 30 of the electric generator 32. Further, the exemplary further torque limiting brake 274 may include liquid coolant ports and other suitable ports so as to enable the brake to effectively operate while providing continuous drag force for extended periods of time.

In exemplary arrangements, the further torque limiting brake 274 may be operated in conjunction with the previously discussed torque limiting brake 26 to effectively control the shaft 30 speed and the torque and speeds of the input 22 and output 28 shafts of the gear box 20. Further, the exemplary arrangement may operate to suppress torsional spikes or prevent speed changes that otherwise cannot be effectively eliminated completely through operation of the torque limiting brake 26. The further torque limiting brake 274 may be used to help avoid damage to the gear box and/or the electrical generator by varying the drag force rapidly and as appropriate so as to avoid undesirable conditions that may arise during the course of operation.

Example arrangements may operate to avoid damage during conditions which may occur in the operation of the wind turbine electric generator. For example, the torque limiting brake 26 as well as the further torque limiting brake 274, may have braking force applied to the maximum extent in the event that the control circuit 242 determines that the electric generator has experienced a lock up condition due to a malfunction. In these circumstances, the rotating assembly of the electric generator will not turn. Applying the torque limiting brake 26 will help to avoid the potential damage that might occur due to the blade-applied torsional forces. It also helps to avoid gear box wind-up forces that would otherwise be encountered. In addition, the further torque limiting brake 274 may operate to further help to resist such damaging forces and their impact on the gear box components.

Also, both brakes 26, 274 may be appropriately applied under emergency conditions. These may include for example, situations where breakage of a turbine blade 16 or other critical component of the system has been detected by the control circuit, and it is desirable to stop the rotation of the blades and other rotating mechanisms of the wind turbine electric generator as quickly as possible. The ability to rapidly and fully engage both brakes may avoid damage that might otherwise occur due to continued rotation of the blades or other rotating mechanism in such emergency circumstances.

Further, in some exemplary arrangements control circuitry may operate to selectively control the actuation of brakes 26 and 274 to avoid or reduce the effects of harmful conditions. For example, in circumstances where excessive vibration is occurring due to a malfunction, the control circuitry may operate to selectively apply and release the brakes independently in accordance with different duty cycles to provide damping. This may be done in a calculated manner based on the properties of the sensed vibrations. Alternatively, the phase relationship, duration, and applied drag force of the braking duty cycles may be varied through operation of control circuitry based on feedback from one or more vibration sensors to adjust each of the phase, duration, and drag force applied by each brake to find the combination which under the current conditions, most effectively reduces the potentially harmful vibrations as the system is slowed to a stop.

Additional actions which contribute to further braking effect may also be implemented. For example, further braking effect can be enacted by changing energy absorption through the generator, such as with respect to a torque/speed relationship. Controlling torque load can be a part of the total braking (slowing/stopping) process. As previously discussed, actions which assist in the braking process can be carried out in cycles to avoid vibration and excessive torque. The processor can determine in real time which (if any) of the different combinations of available brake inducing actions can be simultaneously performed (and the length of performance) without causing unnecessary harm or damage to the wind turbine system. As previously discussed, associated sensors (e.g., vibration sensors) can provide real time data to the processor. This data can be used by the processor to make real time decisions which cause effective and safe braking.

Furthermore, in some arrangements the torque limiting brake 26 may be utilized to prevent a runaway condition. This might occur for example in situations where there is a loss of electrical connection to the power grid and the wind turbine generator might otherwise become free wheeling, but for the available braking force that can be applied. In such circumstances, the control circuit 242 operating the torque limiting brake 26 will cause the reduction in speed of the low speed shaft and will prevent rotation at undesirably high speeds that might otherwise cause damage to components of the wind turbine electric generator. Of course it should be understood that these conditions are merely exemplary of conditions which may occur, and which may be addressed through operation of the torque limiting brakes 26, 274 and other components that are described herein.

As previously discussed, the structural arrangement of an exemplary torque limiting brake (brake control system) also allows it to be installed as an add-on to an existing wind turbine electric generator system ("wind turbine") of a wind turbine plant. Again, the sensing system associated with the brake can sense upcoming conditions (approaching weather) that may cause damage to wind turbine components, such as the gear box. As a result of the sensing, the brake can be timely actuated to slow the shaft so that excessive torque can be absorbed. As discussed in detail already, this braking can be applied to slow the wind turbine low speed gear box input shaft (WT-LSS).

The exemplary embodiments also include at least one interface controller to prevent operational conflicts between the brake control system and other control systems. As previously discussed, the pitch control system can operate to change the pitch of turbine blades to increase or decrease blade speed. Blade pitch may be changed based on various sensed or predicted weather conditions, such as wind speed. Blade pitch may also be changed based on wind turbine component conditions. For example, the wind turbine includes at least one shaft that is operatively connected with (and hence directly or indirectly driven by) the turbine blades. Thus, shaft speed is interconnected with blade pitch. A shaft speed level (e.g., too high or too low) can be changed by adjusting blade pitch. Likewise, a change in shaft speed can trigger an adjustment to blade pitch.

A conflict may occur if the blade pitch control system is operated independently of (not integrated with action of) the brake control system. For example, the pitch control system may react to a (braked) slowing of the low speed shaft to change the blade pitch to try to maintain the same rotational speed of this shaft. That is, if the brake tried to slow the low speed shaft, the pitch system may conversely react (in response to the shaft slowing) to try to maintain the shaft at the same speed. This situation would result in even more torque force that the brake components would have to counteract in order to achieve the desired braking effect. The situation could result in an undesirable escalating struggle between further speed-reducing braking action being applied to reduce the opposite effect of a speed-maintaining pitch adjustment action, and vice versa.

The exemplary embodiment functions to prevent one or more control systems of the wind turbine system or arrangement from operating in an unwanted manner as a result of the (add-on) brake control system being operated. That is, the brake control system can be operated without causing unwanted adjustments of the wind turbine blade pitch angle through the wind turbine pitch control system. The exemplary embodiment prevents the pitch control system from trying to increase rotational speed of the turbine blades in direct response to the turbine blades being slowed due to the brake control system applying preventive braking to the low speed gear box input shaft. As discussed in more detail later, exemplary control methods are used to prevent system conflicts due to operation of the added-on brake control system.

The exemplary control method allows the wind turbine's pitch control system to operate in sync with the torque limiter (of the brake control system). The exemplary control arrangement uses an interface which causes minimal impact on the wind turbine's existing controls, including control hardware, firmware, and software codes.

In an exemplary control method, from the viewpoint of the pitch control system, it continues to operate normally as if the (add-on) brake control system were not present at the wind turbine. That is, the pitch control system still operates based on a received signal representative of shaft speed, which can be the speed of the wind turbine low speed shaft (WT-LSS). However, one or more processors are used to determine what specific shaft speed is to be provided to the pitch control system. This shaft speed value is processor-determined such that based on this particular speed, the pitch control system will not operate to conflict with the applied (or future) braking. As discussed in more detail later, the speed that gets intentionally reported to the pitch control system can be an estimated (invented, fictitious, false) speed instead of the real (actual, measured) shaft speed.

The exemplary control method can produce an estimated shaft speed based on several factors, including present (measured, sensed) factors and future (predicted, expected) factors. In an exemplary embodiment, the control method is based on a state-feedback observer (motion equation based model), like a Kalman filter.

In some embodiments the control method is ordered such that the model is only active when the torque limiter (braking) is active. Thus, if the torque limiter is inactive then the real (measured) shaft speed (of the WT-LSS shaft) will be used by the pitch control system. In other words, the control method can be setup such that operation of the speed estimation model (and thus an estimated speed) is bypassed when the brake control system is not currently operating.

The interface that synchronizes the pitch control system with the brake control system includes at least one microprocessor that can operate one or more software application routines. The processors function as a synchronization (or sync) controller that can analyze data received from several sources to produce one or more outputs that get supplied as inputs to the pitch control system. These outputs correlate with how the brake system is operating. The synchronization controller is associated with at least one data store (e.g., a database).

The synchronization controller can operate on behalf of (or as part of) the brake control system to make the pitch control system operate in agreement with (not opposite to) a preventive braking action. That is, the brake synchronization controller can modify (or substitute) data that is provided to the pitch control system so that (because of this data) it does not operate in a manner that interferes with an applied (or future) braking action from the brake control system. The control circuitry of the sync controller processes programmed instructions that can control torque limiting braking functions and speed varying pitch control so that braking and blade pitch changes are carried out in a coordinated manner.

An example will now be discussed that involves low speed shaft speed data that gets provided to and used by the pitch control system. A shaft speed sensor outputs data that indicates how fast the low speed shaft is currently rotating. Before installation of the brake control system, this speed data may have been provided in a signal directly to the pitch control system (or a processor associated therewith). Based on the speed value received, the pitch control system could then (if necessary) adjust the blade pitch to maintain a desired shaft (or blade speed). That is, in this example the pitch control system operates to adjust blade pitch in direct correlation to received data corresponding to shaft speed.

FIG. 13 shows an example of an exemplary embodiment. Instead of the shaft speed signal going from the speed sensor directly to the pitch control system, this speed data signal is routed (either directly or indirectly) to the synchronization controller. It should also be understood that in some embodiments the synchronization controller is part of the brake control system, but in alternative embodiments it can operate independently of (and separate from) the brake control system.

The sync controller operates in accordance with its programming to determine if a speed signal comparable to that received from the sensor (which reflects actual shaft speed) should be sent to the pitch control system, or whether a different speed (e.g., an estimated determined speed) signal should be sent to the pitch control system due to current operation (or planned upcoming operation) of the brake by the brake control system.

The control arrangement shown in FIG. 13 includes each of a synchronization controller 300, a motion equation based model 302, a selector 304 for status of torque limiter, a wind turbine pitch control system 306, a measured (real, actual) WT-LSS shaft speed 308, an estimated WT-LSS shaft speed 310, and a wind turbine blade pitch angle command 312. The computational model 302 can be configured so that it is only activated when there is a braking operation. Alternatively, in some arrangements it may always be in active status.

As discussed later in more detail, the measured shaft speed 308 can be used as a baseline shaft speed 314 for the model 302 The selector (switch) 304 is operable to dictate which speed output (either actual speed 308 or estimated speed 310) is provided to the pitch control system 306.

The exemplary synchronization controller 300 is configured to receive data from a variety of system sources and sensor sources. This data is used by the computational model 302 to calculate the estimated speed. The data sources include the measured shaft speed data input 308 from at least one speed sensor, brake data input 316 from the brake control system, and pitch data input 318 from the pitch control system 306. Although only a few representative data inputs have been shown for clarity, it should be understood that many more and/or different data inputs may be included. All received data may first be stored in a data store, which can be accessed by the computational model 302.

FIG. 14 shows an example of selector 304 operation during a braking operation. The selector 304 can operate its speed output switch in accordance with whether the torque limiter (status) is on or off. As shown, the estimated shaft speed 310 is provided, via the selector 304, to the pitch control system 306 as a result of a braking operation. In accordance therewith, the measured shaft speed 308 is not provided.

FIG. 15 shows an example of selector 304 operation during a non braking operation. As shown, the measured shaft speed 308 is provided, via the selector 304, to the pitch control system 306. The measured speed 308 (measured WT-LSS shaft speed) can be provided in the absence of (or outside of) a planned or actual braking operation.

The selector 304 can be configured so that one of the actual or estimated speed is provided by default. The pitch control system 306 can then apply whichever shaft speed is provided in order to send (if necessary) pitch angle commands 312 to adjust the turbine blade pitch, in accordance with the programming of the pitch controller.

As shown, the selector 304 can be part of the synchronization controller 300. Alternatively, the selector 304 may be arranged to operate independently. For example, the selector 304 may be part of a stand-alone smart switch system which is remotely located from each of the sync controller, the brake control system, and the pitch control system.

As previously discussed, a synchronization controller can be included in the brake control system. Alternatively, a sync controller may be arranged to operate independently of both the brake control system and the pitch control system. Nevertheless, an exemplary sync controller can function as a synchronizing interface between the brake control system and the pitch control system. The (brake and pitch) systems synchronization is configured to keep the pitch control system from preventing a braking activity from being achieved by the brake control system. The arrangement causes the actions of the pitch control system to be synchronized with the actions of the brake control system. That is, in some scenarios a braking operation has priority over pitch control, so pitch control operation is modified (from normal) in order to permit (and compliment) the braking operation. The synchronizing ability of the exemplary embodiment is especially useful for braking actions conducted in normal wind turbine operation. However, during an emergency situation with the wind turbine, other higher-priority safety controls may interfere with (and override) actions undertaken by the brake control system and/or the pitch control system.

As discussed in more detail hereafter, the sync controller includes hardware, firmware, and/or software that make it (structurally and functionally) configured to operate to cause a proper speed signal to be communicated to the pitch control system. The synchronization controller includes ample communication connections that allow it to be easily installed as an add-on to an existing wind turbine.

In some embodiments the sync controller can independently communicate with both the brake control system and the pitch control system (and/or other control systems associated with the wind turbine). The sync controller may be a stand-alone system component that is installed when the brake control system is installed. In other embodiments, the sync controller may be a part of the installed brake control system. In alternative embodiments the sync controller may be part of a central controller for the entire wind turbine (or wind turbine electric generator plant).

The synchronization controller can determine if the brake is being applied (or is expected to be applied) based on signals received from the brake control system. In one scenario, where there is no indication of brake activation, then the speed signal provided from the sync controller to the pitch controller of the pitch control system can be comparable to the same speed signal detected by the shaft speed sensor. This way, the pitch can be adjusted as normal (as though the brake system was not installed) in direct response to a measured (sensed) shaft speed, with the pitch controller changing the pitch as needed to try to maintain a constant desired shaft speed.

In another scenario, where the brake is being applied (or is soon going to be applied based on a determination by the brake controller of the brake control system), then the synchronization controller provides the pitch control system with a speed signal which indicates that the shaft is rotating at a higher speed than it is actually currently rotating. This signal may cause the pitch control system (based on additional factors) to not provide any adjustment to the blade pitch. Alternatively, this signal may cause the pitch control system (in counteracting the higher shaft speed) to change the blade pitch so less rotational torque is derived from the wind energy. That is, the pitch adjustment acts in concert with the brake. Thus, the pitch control system can be made (tricked) to work with (and in some arrangements augment the effects of) the brake control system to reduce force applied to the gearbox. As can be appreciated, the exemplary synchronization interface can cause the pitch control system to operationally compliment the brake control system, instead of working against the brake control system as in a manner previously discussed.

The sophistication of the programming associated with the synchronization controller of some exemplary arrangements allows it to react to a number of factors to derive a shaft speed signal (or multiple signals) for the pitch control system that is beneficial to the wind turbine. Such signals can include those that are consistent with the desired effects which the brake control system is attempting to apply to the wind turbine. For example, the sync controller can provide the pitch control system with shaft speed data which causes a blade pitch change that reduces torsional shaft driving force acting to turn the low speed shaft, which reduction causes the blade pitch setting to be in better coordination with an increased drag applied (or to be applied in the near future) by the brake.

Shaft speed signals provided to the pitch control system can also include those signals that allow the shaft to continue rotating at a desired speed. For example, the brake may be on (continuously) to provide drag to keep the speed of the shaft below a predetermined threshold. The sync controller can react to operation signals from the brake control system which indicate that a determination has been made that the wind speed is about to drop, so the drag force will be removed. The controller can act on this information to provide the pitch control system with a preemptive signal that causes the blade pitch to be changed now so that more torque (and a higher shaft speed) can be derived from the wind before it slows. In this manner of sync controller operation, even though the wind speed slows, the low speed shaft can be kept rotating (e.g., at the same speed) without any unnecessary slowdown in rotation.

Thus, as can be appreciated, the synchronization controller of some exemplary arrangements can cause efficient operation of the pitch control system with regard to both braking activation and braking removal. The sync controller allows the pitch control system to be affected by an action of the brake control system. The exemplary interface sync controller can advantageously cause the pitch control system to operate in a manner that corresponds with (and contributes to) an action of the brake control system. It follows that the sync controller, by using knowledge of actions involving the brake control system, can contribute to efficient operation of the entire wind turbine electric plant.

Shaft speed was used as an example of a factor (or variable) that an exemplary synchronization controller can use to cause the pitch control system to operate in accordance with the brake control system. However, there are other variables (yaw, pressure, vibration, blade speed, etc.) that a pitch control system may also rely on to adjust blade pitch. It should be understood that the exemplary sync controller arrangements may be programmed to also use these other variables when affecting the pitch control system to comply with an action (goal) of the brake system. That is, the exemplary interface controller is operable to cause the pitch control system to receive not only shaft speed signals, but also other respective signals for each of the different variables (alternatively referred to herein as conditions or factors) which may cause pitch control system action that negates or conflicts with brake control system action. Of course in other exemplary arrangements only some of the aforementioned variables may be used while in other exemplary arrangements different or additional variables may be utilized.

Returning to the example of the brake synchronization controller affecting the pitch control, the sync controller is associated with inputs that can receive multiple input signals from various sensors and from the brake controller of the brake control system. The controller can also provide multiple output signals that are received by the pitch control system. The sync controller is programmed to use numerous algorithms in analyzing data to estimate shaft speed, which estimated speed is then provided to the pitch control system. As previously noted, some of the algorithms may comprise a Kalman filter. A Kalman filter can be used to provide control outputs in response to the various inputs, while compensating and adjusting for the effects of electrical noise, inaccurate sensor readings, an inability to accurately sense at least some of the parameters associated with control of one or more systems (e.g., the brake control system), and/or other accuracy affecting factors. An exemplary Kalman filter takes into consideration all operational data that may affect (e.g., interfere with) a braking action indicted by the brake control system. The data can also include data corresponding to measurements, error sources, and prior knowledge about one or more systems and measuring devices. This data is processor-analyzed based on knowledge of the various related system dynamics to generate a best estimate of a shaft velocity to provide to the pitch control system. The exemplary Kalman filter is arranged such that the best estimate of shaft speed is determined in a manner in which error is statistically minimized. The analyzing (including the shaft speed estimating) conducted by the sync controller can be carried out in real time. Thus, operation of the pitch control can be simultaneously optimized to accordingly augment the brake control operation.

It should also be understood that the brake synchronization controller of some exemplary arrangements are not limited to only influencing operation of the pitch control system. An exemplary sync controller operates software which represents a mathematical model of the entire wind turbine system and its current (real time) system operations. This software enables the sync controller to also influence (e.g., by sending signals to) other control systems of the wind turbine so that they also do not act to interfere with (or inhibit) action by the brake control system. These other control systems may include systems for yaw control, rotor speed control, generator torque control, power control, feedback control, etc. This software also allows the sync controller to likewise operate to ensure that these other control systems are not adversely affected by a braking action indicated by the brake control system. Thus, this exemplary sync controller can communicate with many other system controllers (and/or a central main controller of the wind turbine) to ensure that the wind turbine is efficiently and safely operated with respect to actions indicated by the brake control system.

Figure 16:
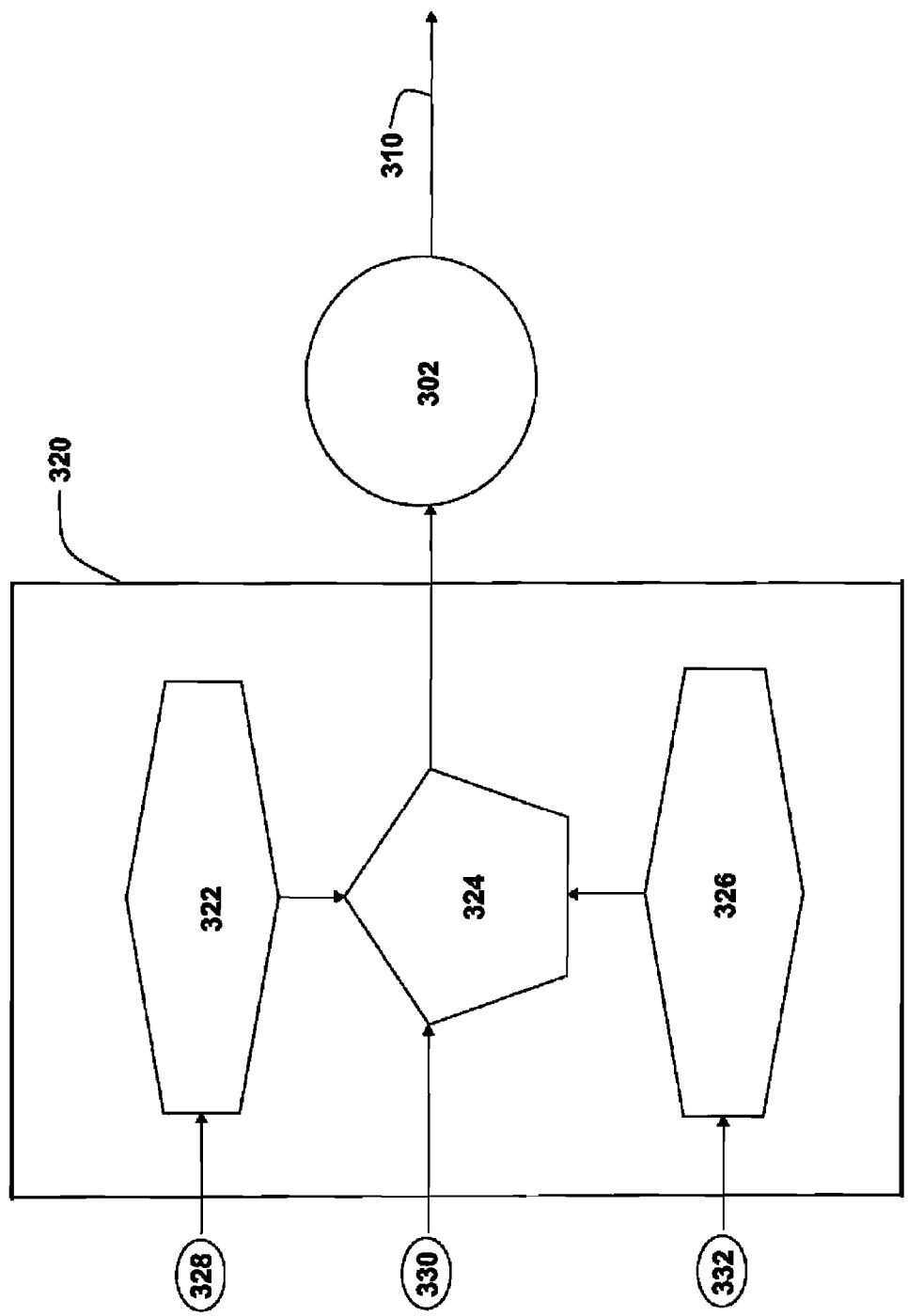
FIG. 16 shows an exemplary synchronization controller with the ability to operate an algorithmic computational model to analyze informational data associated with various systems of a wind turbine electric generator.

FIG. 16 shows an example of informational system data that the synchronization controller 300 can analyze, through operation of the computational model 302, in order to produce an estimated speed 310. As can be seen, the model 302 takes into combined consideration various data associated with the wind turbine. The motion equation model 302 takes into consideration the current state (or status) of several control systems in the wind turbine, and the known and projected system errors associated with these control systems. The model also takes into consideration measurements received from sensors, and the known and projected sensing errors associated with these sensors.

The received data can be stored in at least one data store 320. The data store can be a part of (or accessible by) the sync controller arrangement. As a representative example, stored information can include control system states 322, system wide data 324, and measurement states 326. For example, the control system states 322 may include system error data 328. The combined (total) data 324 can also include much other information 330 that may be valuable in determining the estimated speed 310. The measurement states 326 may include measurement error data 332. It should be understood that various sources of data can be used in accordance with data requirements of the at least one computational model 302 that is being operated by the sync controller 300. As previously noted, the real (measured) shaft speed 308 may be used as a baseline shaft speed in the speed estimating model 302.

Figure 17:
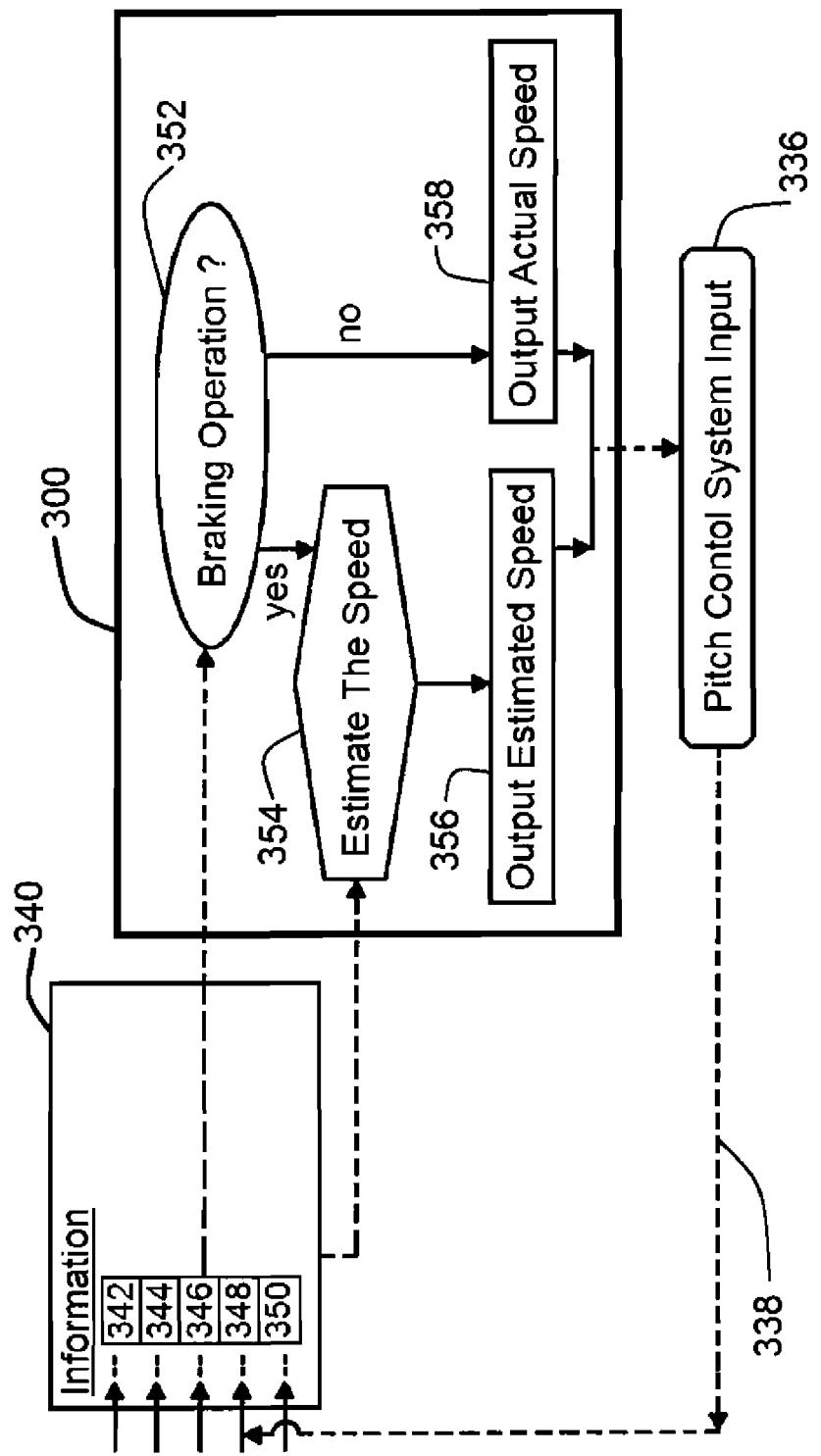
FIG. 17 shows an exemplary flow arrangement which a synchronization controller can follow to provide either estimated or actual speed data for a pitch control system.

FIG. 17 represents an exemplary method of operating a synchronization controller. For ease of understanding, the synchronization controllers shown in the drawings will be commonly identified by the reference numeral 300. However, it should be understood that the sync controllers can vary in configuration and/or location.

FIG. 17 shows a sync controller 300, input 336 to a pitch control system, output 338 from the pitch control system, and at least one data store 340 (e.g., a database, hard drive, memory, portable storage, etc.). The sync controller 300 can access the data store 340 which includes turbine system information. The data store information can include data corresponding to actual shaft speed data 342, sensor signal data 344 received from sensors, brake control system data 346 (e.g., updated detailed knowledge on current and/or future braking operations), pitch control system data 348 (e.g., current status, measurements, and settings involving the pitch control system), and/or data pertaining to other (control) systems of the wind turbine, etc. The sync controller 300 operates at least one speed-estimating model (software) application, as previously discussed.

The data store 340 may be a part of the sync controller 300 or it may be remotely located therefrom, either on-site or off-site of the wind turbine. As previously discussed, the data store 340 can include various information that the algorithmic model analyzes to generate estimated shaft speed. This estimated speed when provided to the pitch controller can cause the pitch control system to function in substantial accordance with a braking operation undertaken by the brake control system.

The exemplary synchronization controller can review data received from the brake control system to determine whether a braking operation is active. The sync controller can also review the details and purpose (goal) associated with the braking operation. For example, braking may occur until certain detectable criteria are met. An active braking operation can include both already occurring or planned (future) braking. For example, based on a prediction of approaching adverse wind speeds, the brake control system may be programmed to plan for a preventive braking action that is to begin at a set (future) time, where only four minutes and thirty seconds remain before the actual physical braking action occurs. The sync controller can assess this knowledge and use it accordingly in a speed estimating process.

As shown in FIG. 17, the sync controller 300 in step 352 can determine whether there is a braking operation. An answer to the braking operation inquiry can be "yes" or "no". Upon a positive ("yes") determination of a braking action (whether current or planned), the sync controller 300 operates the speed estimating model to analyze the pertinent information stored in the data store 340. The sync controller 300 in step 354 then calculates an estimated speed. The sync controller 300 in step 356 can then output the estimated speed to an input 336 of the pitch control system.

If there is no indication of a braking action in step 352 (i.e., a negative or "no" determination), then the sync controller can access the measured (actual) shaft speed. As shown in step 358 the sync controller 300 can then output the actual speed to the input 336 of the pitch control system. That is, since there is no braking action, there is no need to ensure that the pitch control system does not negatively affect any braking action. Nor is there any need to determine whether the pitch control system can be made to assist or augment any braking action. That is, in some embodiments, when the sync controller determines that an actual shaft speed is to be output, then there is no need for the sync controller to also operate the speed estimating model.

Figure 18:
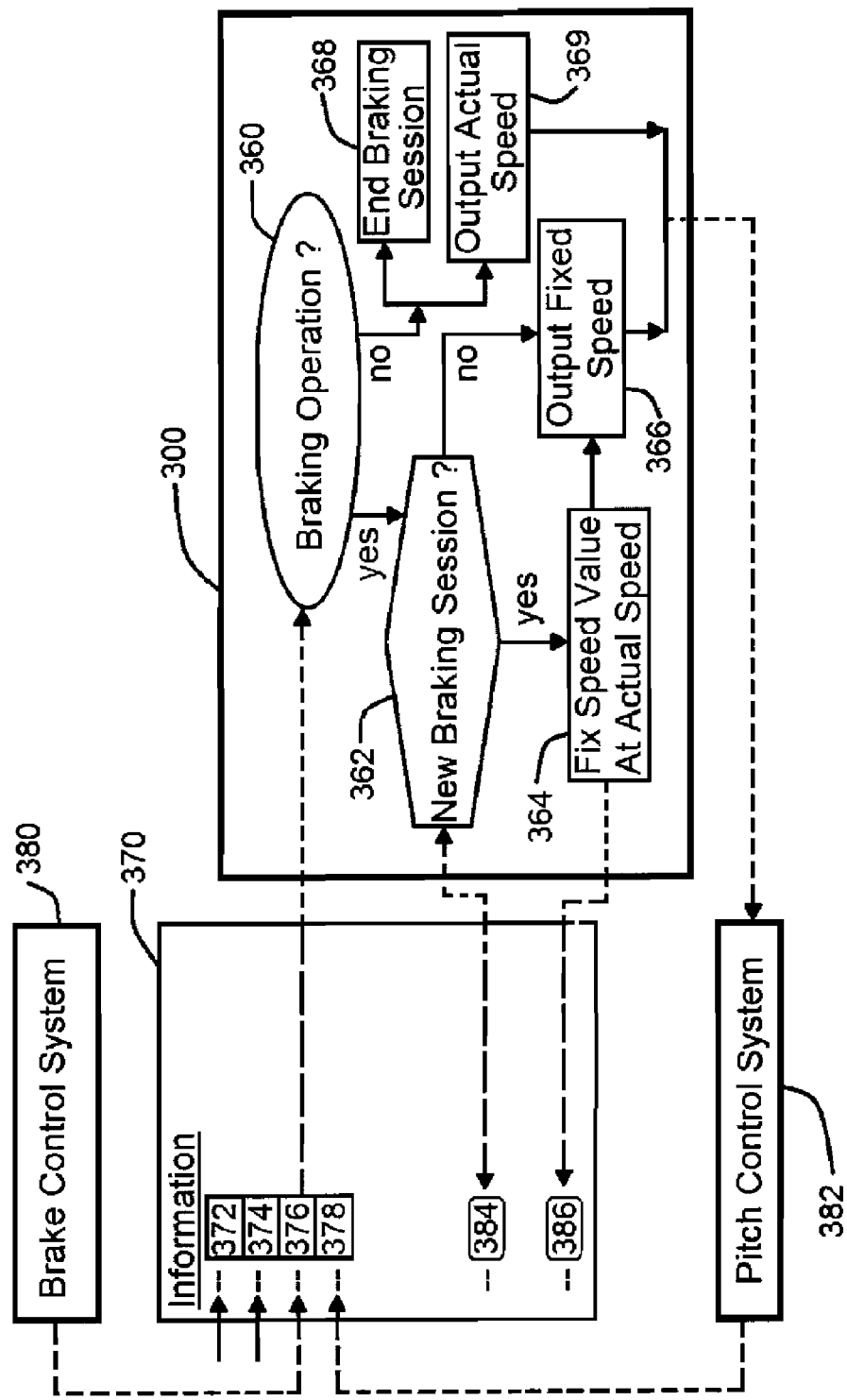
FIG. 18 shows a flow arrangement which an independent interface controller can follow to synchronize a pitch control system with a brake control system.

FIG. 18 represents an alternative method of operating a synchronization controller 300. The method uses a simplified speed estimating model in order to provide easier understanding of the capabilities of the synchronization controller operation, especially in a scenario where an estimated shaft speed is not continuously recalculated. Rather, with the simplified model, during a braking operation the shaft speed provided to the pitch controller can remain a constant single speed. For example, the estimated shaft speed can be quickly fixed (set or assigned) by the model to be the same speed which occurs at the time the braking operation is initiated. Such a scenario may occur when braking is to be applied only for a short duration. Another scenario may involve emergency braking. The fixing of the estimated shaft speed at the currently measured (single value) shaft speed at least temporarily places the pitch control system in a hold (delay) status. During this status, a change in shaft speed is not a factor that gets considered by the pitch controller. Thus, the actual change (slowing) of shaft speed due to the braking action will not lead to an unwanted pitch control action which is based solely on this actual speed change. Further, control circuitry for the synchronization controller can be configured that during such a simple direct (one to one) estimated speed fixing scenario, the complex algorithmic speed estimating model is completely bypassed.

It should be understood that in other more sophisticated examples, a particular estimated shaft speed can be chosen by the synchronization controller such that the pitch controller does not need to make any pitch adjustments during the life of a braking operation. However, if for some reason during the braking operation other factors influence the pitch controller to make pitch adjustments (or other adjustments that may affect the braking operation), then the synchronization controller can nevertheless counteract such adjustments by recalculating (in real time) a new estimated shaft speed that takes into consideration the influencing factors, and then feeding the newly updated estimated speed to the pitch controller.

Returning to the example of FIG. 18, in step 360 the synchronization controller 300 determines whether there is a braking operation. The synchronization controller has access to this information from the data store 370 and/or the brake control system 380. The data store 370 can include information associated with actual speed data 372, sensors data 374, brake control system data 376, and pitch control system data 378. The data store 370 can additionally include information associated with braking session status data 384, fixed speed value data 386, etc.

If there is a braking operation, then as shown in step 362 the sync controller 300 determines whether this braking operation is new or whether it is part of a current (on going, in process) braking operation session. The sync controller 300 can determine whether a braking operation is new by checking the braking session status data 384 stored in the data store. If the sync controller 300 determines that the braking operation is new, then as shown in step 364 a new braking session 384 is established in the data store 370, with an appropriate status identifier.

Furthermore, upon the sync controller 300 determining in step 364 that the braking operation is new, then may be obtained directly from speed sensors associated with the shaft, from the latest shaft speed value 372 stored in the data store, or indirectly from another control system of the wind turbine, etc. An estimated speed value 386 in the data store is then set (fixed) to equate to this obtained single speed value. That is, the operational method can set the estimated speed value to be equal to the obtained (measured) speed value. The estimated speed value 386 stored in the data store can remain fixed (constant) until the braking session ends. As shown in step 366, this fixed value 386 for the estimated speed (which can be accessed from the data store) is then used as the shaft speed which is output (indicated or supplied) to the pitch control system 382.

If in step 362 the sync controller determines that the braking operation is part of a current braking session, then the fixed speed value 386 (which is already stored in the data store) is made available to the pitch control system 382.

If in step 360 the sync controller determines that there is no braking operation, then in step 368 the data store 370 is updated (via a status indicator) to reflect the end of the braking session 384. Furthermore, since there is no active braking operation, then (as represented in step 369) actual shaft speed can be the speed value which is fed to the pitch control system.

Figure 19:
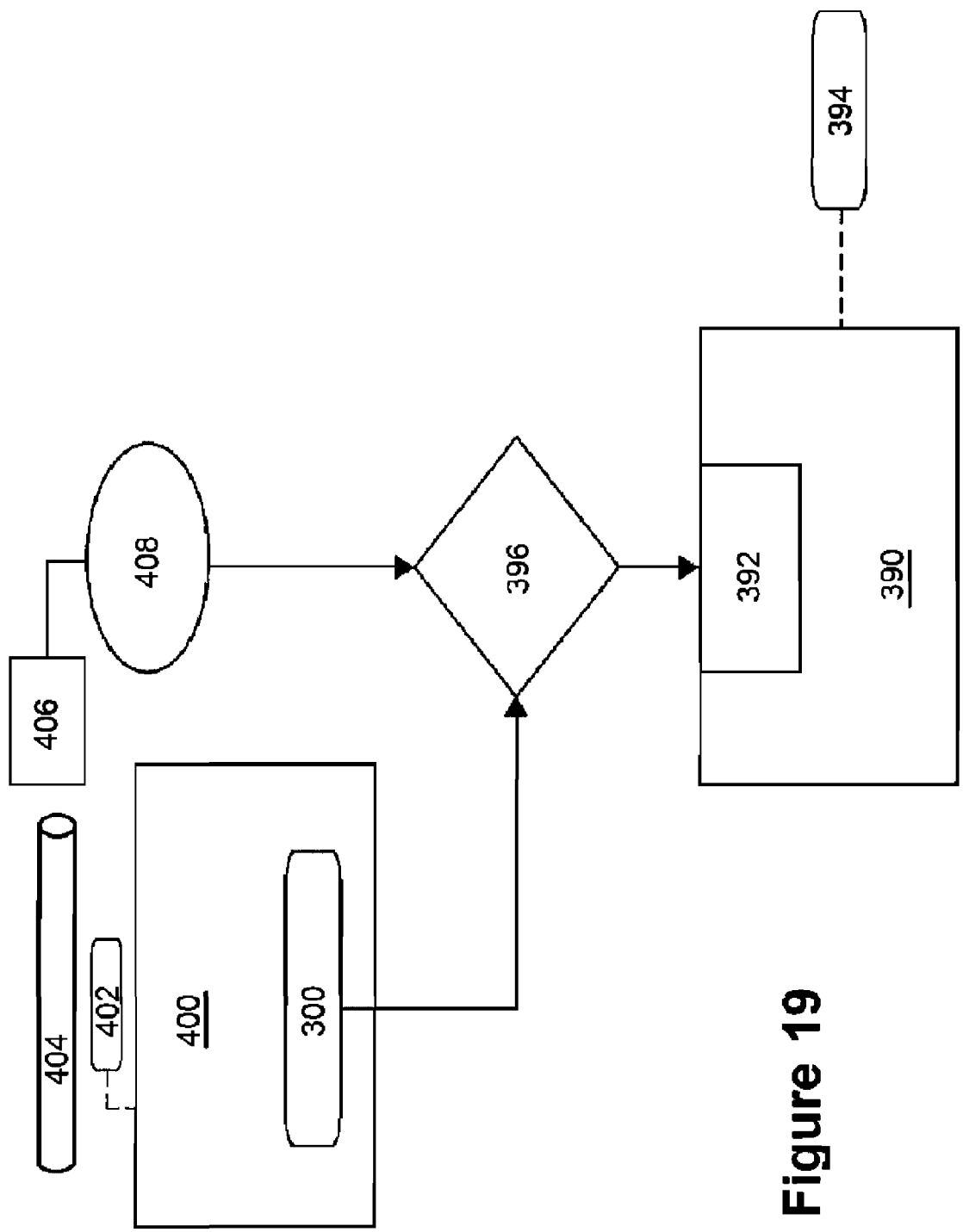
FIG. 19 shows a brake control system comprising a speed estimator which can provide estimated speed data to a speed selector controller.

FIG. 19 shows an exemplary embodiment in which a speed estimator computer is a part of a brake control system 400. As previously discussed, the speed estimator computer may comprise a synchronization controller 300 associated with computer executable instructions that are stored in at least one data store and that correspond to an algorithmic computational model. The brake control system 400 can control operation of at least one brake 402. A pitch control system 390 includes a shaft speed input device or port 392. The pitch control system can adust pitch of the turbine blades 394 based at least partly on a received shaft speed.

Also shown in FIG. 19 are a speed selection control 396, a shaft 404, a speed sensor 406, and a measured speed 408.

The speed selection control 396 operates as a switch to output shaft speed data to the shaft speed input 392. For example, in response to a begin-braking operation signal from the brake control system 400 (e.g., a controller thereof), the speed selection control unit 396 can operate to output received estimated speed data. During the time period of the braking operation, any received measured speed is interrupted from being output. In response to an end-braking operation signal from the brake control system 400, the speed selection control 396 can operate to output the measured speed data. The speed selection control 396 can comprise a selector controller (comprising at least one control circuit with a processor) which operates independently of (and is spaced from) both the brake control system 400 and the pitch control system 390.

In an alternative embodiment, the speed selection control 396 initiates communication directly with the brake control system 400 to determine if a brake operation is actually completed. Similarly, the selector controller 396 can initiate communication to find out if a brake operation was initiated. The inquiring communications can be carried out on a periodic or continuous basis.

In a further alternative embodiment, the brake control system 400 is configured to provide (to the speed selection control 396) estimated speed data at regular intervals throughout a braking operation. Thus, a braking operation automatically times out if the speed selection controller 396 does not receive some estimated speed data within the predetermined time period. By default the selector controller 396 then allows the measured speed data 408 to be passed onto the pitch control system 390, e.g., the measured speed is reconnected with the shaft speed input 392 of the pitch control system.

It should be understood that other embodiments of the speed selection control 396 can be employed. For example, the speed selection control 396 may be part of the brake control system 400, such as in a manner previously discussed. Also, the speed selection control 396 may comprise an estimated speed input port which is given priority over a measured speed input port. Thus, estimated speed signals (or data) are automatically acted on before any measured speed signal.

It should also be understood that wired and/or wireless communication paths can be used in transferring data between different systems and/or components of the wind turbine. Thus, some components (e.g., a speed selection controller) may be located off-site of the wind turbine.

An exemplary synchronization controller can also include plant protection software that causes all decisions to be prioritized with plant safety being above any single action that may be desired by the brake control system. For example, the sync controller, based on knowledge gleaned from other control systems operating in the wind turbine, is able to prevent indicated braking actions (e.g., a braking removal action) that may conflict with safety of the wind turbine (or an entire wind turbine electric generator plant). Also, as previously noted, the sync controller may be installed to function as part of the plant's central controller, which enables it to easily access such operational knowledge from each of the plant's many control systems.

In review, an exemplary control method allows a wind turbine pitch control system to function together with a torque limiter (brake control system) without increasing the torque. The exemplary method has minimal impact on existing pitch control system software by providing an effective communication interface. A synchronization controller used in the exemplary method applies one or more algorithmic models to calculate an estimated (optimum) speed to assign to the low speed shaft. The sync controller can then cause this estimated determined speed to be input to the pitch control system. An ideal shaft speed is chosen (calculated) which best causes the pitch control system to efficiency operate to optimally assist the braking operation. The exemplary communication interface causes the estimated speed to be recognized by the pitch control system as a normally received speed, as if the brake control system were not installed at the wind turbine. Thus, the exemplary control method removes system conflicts that may arise as a result of the brake control system being installed as an add-on to an existing wind turbine electric generator.

Of course it should be understood that the structures and operations described are exemplary, and in other embodiments other structures and operations may be used. It should also be understood that an exemplary wind turbine system is not limited to use in the production of electric power. For example, other uses for an exemplary wind turbine system include water flow management, such as in irrigation, ice prevention, algae control, fluid mixing, etc.

Thus, the new wind turbine electric generator with torque limiting brake in exemplary embodiments achieve desirable properties, eliminate difficulties encountered in the use of prior devices and systems, solve problems, and attain the desirable results described herein.

In the foregoing description, certain terms have been used for brevity, clarity, and understanding. However, no unnecessary limitations are to be implied therefrom, because such terms are used for descriptive purposes and are intended to be broadly construed. Moreover, the descriptions and illustrations herein are by way of examples, and the invention is not limited to the details shown and described.

In the following claims, any feature described as a means for performing a function shall be construed as encompassing any means known to be capable of performing the recited function, and shall not be deemed limited to the particular structure shown in the foregoing description or mere equivalents thereof.

Further, it should be understood that language which refers to a list of items such as "at least one of a, b or c" (Example 1) means "at least one of a, b and/or c." Likewise, it should be understood that language which refers to a list of items such as "at least one of a, b and c" (Example 2) means "at least one of a, b and/or c." The list of items in Example 2 is not required to include one of each item. The lists of items in both Examples 1 and 2 can mean "only one item from the list of any combination of items in the list." That is, the lists of items (in both Examples 1 and 2) can mean only a, or only b, or only c, or any combination of a, b and c (e.g., ab, ac, bc, or abc).

Having described the features, discoveries and principles of the invention, the manner in which is constructed and operated and the advantages and useful results attained; the new and useful structures, devices, elements, arrangements, parts, combinations, systems, equipment, operations, methods of processes and relationships are set forth in the appended claims.

I claim:

1. An apparatus comprising:
a torque limiting brake,
wherein the torque limiting brake is configured to operatively connect with a low speed gear box input shaft of a gear box of a wind turbine system in which the low speed gear box input shaft is in operative connection with at least one rotatable wind turbine blade and a high speed gear box output shaft of the gear box is in operative connection with an electric generator, wherein the torque limiting brake acts on the gear box input shaft other than through gears of the gear box,
wherein the torque limiting brake is configured to be in operative connection with at least one sensor that is configured to sense at least one property that corresponds to:
a future available torsional force above a threshold that may act on the gear box input shaft resulting from predictive future movement of the at least one rotatable wind turbine blade, where the future torsional force is not yet available to be applied to the low speed gear box input shaft;
wherein the torque limiting brake is operative responsive at least in part to the at least one sensor to selectively apply continuously both before the future torsional force is available and thereafter for as long as the torsional force is available, variable drag force to maintain below the threshold, torsional force resulting from movement of the at least one rotatable wind turbine blade that is applied to the low speed gear box input shaft.

2. The apparatus according to claim 1
wherein the brake includes a hollow brake shaft,
wherein the brake shaft is configured to operationally surround in telescoping relation the low speed gear box input shaft.

3. The apparatus according to claim 2
wherein the brake is part of a coupling arrangement,
wherein the coupling arrangement includes the hollow brake shaft and at least one shrink disc,
wherein the at least one shrink disc is operable to hold the low speed gear box input shaft, the hollow brake shaft and a low speed shaft that is operatively connected with at least one rotatable wind turbine blade in operative engagement through radial compressive force.

4. An apparatus comprising:
a torque limiting brake configured for operation in a wind turbine system which includes a low speed gear box input shaft that is in radially compressive connection with a low speed shaft that is operatively connected with at least one blade that is rotatable to cause torsional force to act on the low speed gear box input shaft,
wherein the brake includes a hollow brake shaft,
wherein the hollow brake shaft is configured to operationally surround and accept the low speed gear box input shaft in telescoping relation therein,
wherein the brake is operable to provide through the hollow brake shaft, braking force to the low speed gear box input shaft,
wherein the brake is automatically controllable responsive to a controller to continuously selectively apply variable braking force to maintain the torsional force applied to the low speed gear box input shaft below a predetermined threshold by providing pre-threshold preventive braking force, responsive at least in part to at least one sensor-based controller prediction that the predetermined threshold will be exceeded without the preventive braking.

5. The apparatus according to claim 4 wherein the brake is part of a torque limiting braking system,
wherein the braking system includes the controller,
wherein the controller includes at least one circuit including a microprocessor,
wherein the at least one circuit is operable to cause the brake to provide the preventive braking.

6. The apparatus according to claim 5
wherein the at least one circuit is operable to make the at least one sensor-based controller prediction,
wherein the at least one circuit is configured to operate responsive at least in part to making the at least one sensor-based controller prediction, to cause the brake to provide the preventive braking force.

7. The apparatus according to claim 6
wherein the at least one circuit is associated with at least one sensor, wherein the at least one circuit is operable to receive at least one sensor signal associated with at least one sensing by the at least one sensor,
wherein the at least one circuit is configured to operate based at least in part on receiving the at least one sensor signal, to predict that the predetermined threshold will be exceeded without the preventive braking force.

8. The apparatus according to claim 7
wherein the at least one sensor signal corresponds to at least one weather condition occurring remotely from the wind turbine system,
wherein the at least one circuit is operable to determine, based at least in part on the at least one weather condition, that conditions exist for the low speed input shaft to receive a threshold-exceeding torsional force within a predetermined future time period.

9. The apparatus according to claim 8
wherein the braking system includes the at least one sensor,
wherein the at least one sensor includes at least one of Doppler radar or Lidar.

10. The apparatus according to claim 4
wherein the brake is part of a coupling arrangement,
wherein the coupling arrangement includes the hollow brake shaft and at least one shrink disc,
wherein the at least one shrink disc is operable to hold the low speed gear box input shaft, the low speed shaft and the hollow brake shaft in operative engagement through radial compressive force.

11. An apparatus comprising:
a wind turbine arrangement,
wherein the wind turbine arrangement includes a brake control system,
wherein the brake control system includes a torque limiting brake,
wherein the torque limiting brake is configured to operatively apply during a braking operation by the brake control system, braking force to a low speed input shaft of a gear box of the wind turbine arrangement,
wherein the braking operation causes a speed reduction in a shaft speed of at least one of the low speed input shaft or an output shaft associated with the gear box,
wherein the wind turbine arrangement includes a pitch control system,
wherein the pitch control system is configured to operatively change pitch of blades of the wind turbine arrangement,
wherein the pitch control system is operable to receive speed data indicative of the shaft speed,
wherein the pitch control system is operable responsive at least in part to receiving speed data indicative of a reduction in the shaft speed, to adjust blade pitch to counteract the reduction,
wherein the wind turbine arrangement includes a synchronization controller,
wherein the synchronization controller is configured to receive from the brake control system, information associated with the braking operation,
wherein the synchronization controller is operable responsive at least in part to the information, to cause the pitch control system to receive speed data which corresponds to an estimated shaft speed, which estimated shaft speed is higher than the actual shaft speed,
wherein receipt of the speed data which corresponds to the estimated shaft speed prevents the pitch control system from adjusting blade pitch in a manner that fully counteracts the speed reduction caused by the brake control system.

12. The apparatus according to claim 11 wherein the synchronization controller is operable to generate the speed data which corresponds to the estimated shaft speed.

13. The apparatus according to claim 12 wherein the synchronization controller includes at least one algorithm, wherein the at least one algorithm comprises a Kalman filter, wherein the synchronization controller is configured to operate the Kalman filter in generating the speed data that corresponds to the estimated shaft speed.

14. The apparatus according to claim 13 wherein the synchronization controller is configured to receive data indicative of a measured speed of the at least one shaft from at least one speed sensor, and wherein the synchronization controller is configured to use the measured speed as a baseline speed in operation of the Kalman filter.

15. The apparatus according to claim 12 wherein the synchronization controller is configured to operate in the absence of a braking operation, to cause the pitch control system to receive speed data which corresponds to the actual shaft speed.

16. The apparatus according to claim 12 wherein the synchronization controller is operable to communicate with both the brake control system and the pitch control system, and wherein the synchronization controller is configured to receive from the pitch control system, information associated with current blade pitch settings.

17. The apparatus according to claim 11 wherein the at least one shaft associated with the gear box comprises the low speed input shaft of the gear box,
wherein the synchronization controller is operable to prevent the blades from having a pitch that causes a speed-increasing force to be applied to the low speed input shaft, which force acts counter to the braking force.

18. Apparatus comprising:
a torque limiting brake,
wherein the torque limiting brake is configured to operatively connect with a low speed gear box input shaft of a gear box of a wind turbine system other than through gears of the gear box, wherein the low speed gear box input shaft is in operative connection with at least one rotatable variable pitch wind turbine blade, and which gear box has a high speed gear box output shaft in operative connection with an electric generator configured to operate in a rotational speed range, wherein the pitch of the at least one blade is variable to maintain generator operation within the rotational speed range,
wherein the torque limiting brake is configured to be in operative connection with at least one sensor that is configured to sense at least one property that corresponds to
a currently available torsional force resulting from current movement of the at least one rotatable wind turbine blade, where the currently available torsional force is currently available to be applied to the low speed gear box input shaft,
wherein the torque limiting brake is operative for as long as the currently available torsional force is above a threshold, to continuously selectively apply variable drag force to maintain torsional force that is applied to the low speed gear box input shaft below the threshold while generator operation is maintained within the rotational speed range.

19. The apparatus according to claim 1
wherein the torque limiting brake is configured to be in operative connection with at least one further sensor, wherein the at least one further sensor is configured to sense at least one property that corresponds to a torsional force that is currently available to act on the low speed gear box input shaft,
wherein the torque limiting brake is operative responsive at least in part to each of the at least one sensor and the at least one further sensor to maintain below the threshold the torsional force applied to the low speed gear box input shaft.

20. The apparatus according to claim 19
wherein the at least one further sensor comprises a strain sensor.

21. The apparatus according to claim 18
wherein the at least one sensor comprises a strain sensor.

* * * * *